(12) United States Patent
Seo et al.

(10) Patent No.: US 8,782,892 B2
(45) Date of Patent: Jul. 22, 2014

(54) HEAT TRANSFER PLATE AND METHOD OF MANUFACTURING THE SAME

(71) Applicant: Nippon Light Metal Company, Ltd., Tokyo (JP)

(72) Inventors: Nobushiro Seo, Shizuoka (JP); Hisashi Hori, Shizuoka (JP); Shinya Makita, Shizuoka (JP)

(73) Assignee: Nippon Light Metal Company, Ltd., Tokyo (JP)

( * ) Notice: Subject to any disclaimer, the term of this patent is extended or adjusted under 35 U.S.C. 154(b) by 0 days.

(21) Appl. No.: 13/731,229

(22) Filed: Dec. 31, 2012

(65) Prior Publication Data

US 2013/0126138 A1 May 23, 2013

Related U.S. Application Data

(62) Division of application No. 12/595,118, filed as application No. PCT/JP2008/055240 on Mar. 21, 2008, now Pat. No. 8,365,408.

(30) Foreign Application Priority Data

| Apr. 16, 2007 | (JP) | ................................ 2007-106745 |
| Sep. 6, 2007 | (JP) | ................................ 2007-231179 |
| Feb. 1, 2008 | (JP) | ................................ 2008-022228 |
| Mar. 6, 2008 | (JP) | ................................ 2008-056543 |

(51) Int. Cl.
*B21D 53/00* (2006.01)

(52) U.S. Cl.
USPC ........................ 29/890.04; 165/169

(58) Field of Classification Search
USPC ......... 29/890.038, 890.032, 890.039, 890.04, 29/890.041, 890.053, 890.054, 515, 530; 165/168, 169; 228/112.1
See application file for complete search history.

(56) References Cited

U.S. PATENT DOCUMENTS

| 2002/0153130 A1 | 10/2002 | Okamoto et al. |
| 2003/0210527 A1 | 11/2003 | Saita et al. |

(Continued)

FOREIGN PATENT DOCUMENTS

| CN | 1827292 A | 9/2006 |
| CN | 1886522 A | 12/2006 |

(Continued)

OTHER PUBLICATIONS

Chinese Notice of Reasons for Refusal application No. 201110160109.8 dated Jan. 30, 2013.

(Continued)

*Primary Examiner* — David Bryant
*Assistant Examiner* — Ryan J Walters
(74) *Attorney, Agent, or Firm* — Squire Patton Boggs (US) LLP

(57) ABSTRACT

A method of manufacturing a heat transfer plate includes: an insertion process of inserting a heat medium pipe in a concave groove formed in a bottom face of a lid groove open to an obverse of a base member; a lid groove closing process of arranging a lid plate in the lid groove; and a main joining process of moving a main joining rotation tool along butt portions ($V_1$, $V_2$) between sidewalls of the lid groove and side faces of the lid plate, wherein in the main joining process a plastic fluidizing material (Q), where the base member and the lid plate are fluidized due to frictional heat, is made to flow in air gap portions (P1, P2) formed around the heat medium pipe.

3 Claims, 24 Drawing Sheets

(56) References Cited

U.S. PATENT DOCUMENTS

| | | |
|---|---|---|
| 2003/0210547 A1 | 11/2003 | Oskorep et al. |
| 2004/0194942 A1 | 10/2004 | Okamoto et al. |
| 2004/0257750 A1 | 12/2004 | Saita et al. |
| 2006/0096748 A1 | 5/2006 | Okamoto et al. |
| 2006/0197919 A1 | 9/2006 | Fujimori et al. |
| 2007/0068664 A1 | 3/2007 | Schmeler et al. |
| 2007/0163120 A1 | 7/2007 | Okamoto et al. |
| 2008/0245517 A1 | 10/2008 | Ishikawa et al. |

FOREIGN PATENT DOCUMENTS

| | | |
|---|---|---|
| JP | 10-54688 | 2/1998 |
| JP | 2002-257490 | 9/2002 |
| JP | 2003-329379 | 11/2003 |
| JP | 2004-009113 | 1/2004 |
| JP | 2004-314115 | 11/2004 |
| JP | 2005-090794 A | 4/2005 |
| JP | 2006-150454 | 6/2006 |
| JP | 2007-024457 | 2/2007 |
| TW | 506874 B | 10/2002 |

OTHER PUBLICATIONS

Taiwan Office Action dated Dec. 14, 2011 corresponding to Taiwan Application No. 097112783. No copy provided, per MPEP 609. Submitted in U.S. Appl. No. 12/595,118.

HEAT TRANSFER PLATE AND METHOD OF MANUFACTURING THE SAME

CROSS REFERENCE TO RELATED APPLICATIONS

This is a divisional application of U.S. patent application Ser. No. 12/595,118, filed on Oct. 8, 2009, which is a 371 application of International Patent Application No. PCT/JP2008/055240 filed Mar. 21, 2008 and claims priority of Japanese Patent Application No. 2007-106745, filed on Apr. 16, 2007; Japanese Patent Application No. 2007-231179, filed on Sep. 6, 2007; Japanese Patent Application No. 2008-022228, filed on Feb. 1, 2008; and Japanese Patent Application No. 2008-056543, filed on Mar. 6, 2008. The subject matter of the earlier filed applications is hereby incorporated by reference.

TECHNICAL FIELD

The present invention relates to a method of manufacturing a heat transfer plate used, for example, for a heat exchanger, a heating appliance, a cooling appliance, and the like.

BACKGROUND ART

A heat transfer plate arranged in contact with or adjacently to an object to be heat-exchanged, heated, or cooled is formed by inserting a heat medium pipe for circulating a heat medium such as a high temperature liquid, cooling water, and the like through a base member which is a main body of the transfer plate. A conventional heat transfer plate and a method of manufacturing the transfer plate are disclosed in Japanese Patent Laid-Open Publication Nos. 2004-314115 and 2007-24457.

FIGS. 24A and 24B are drawings showing a heat transfer plate relating to the Japanese Patent Laid-Open Publication No. 2004-314115; FIG. 24A is a perspective view; and FIG. 24B is a side view. A conventional heat transfer plate 100 comprises a rectangular lid groove 106 in section view and open to an obverse of a base member 102, the base member 102 having a concave groove 108 open to a bottom face of the lid groove 106, a heat medium pipe 116 inserted in the concave groove 108, and a lid plate 110 fitted in the lid groove 106; and plasticized regions $W_1$ and $W_2$ are formed by friction stirring joining being applied along respective butt faces between both side walls 105, 105 in the lid groove 106 and both sides 113, 114 of the lid plate 110.

FIG. 25 is a side view showing a method of manufacturing a heat transfer plate relating to the Japanese Patent Laid-Open Publication No. 2007-24457. The heat transfer plate relating to the Japanese Patent Laid-Open Publication No. 2007-24457 is configured so as to insert an expandable and contractible tube 122 (heat medium pipe) in a groove 121 formed in a base member 130, to push the tube 122 in the groove 121 by a heat conductive plate 123, to deform the tube 122, and to closely contact it with the groove 121. Furthermore, the base member 130 and the heat conductive plate 123 are adhered through an adhesive.

DISCLOSURE OF THE INVENTION

As shown in FIG. 24B, with respect to the heat transfer plate 100 relating to the Japanese Patent Laid-Open Publication No. 2004-314115, air gap portions 120 is formed by the concave groove 108, an outer face of the heat medium pipe 116 and a lower face of the lid plate 110; however, if there exists the air gap portions 120 inside the heat transfer plate 100, heat released from the heat medium pipe 116 is difficult to be transferred to the lid plate 110 and the base member 102; and therefore, there is a problem that a heat exchange efficiency of the heat transfer plate 100 is reduced.

On one hand, with respect to the heat transfer plate relating to the Japanese Patent Laid-Open Publication No. 2007-24457, as shown in FIG. 25, because the base member 130 and the heat conductive plate 123 are adhered through an adhesive, there is a problem that a joining force is weak. Furthermore, when the expandable and contractible tube 122 is pushed by the heat conductive plate 123, a deformed portion (not shown) of the tube 122 is extended outside; therefore, the tube 122 is deformed into a desired form and there is a high possibility that an air gap occurs between the tube 122 and the groove 121. If the air gap exists between the expandable and contractible tube 122 and the groove 121, heat released from the tube 122 is difficult to be transferred to the heat transfer plate 123 and the base member 130; therefore, there is a problem that the heat exchange efficiency of the heat transfer plate is reduced.

From such a view point, with respect to the present invention, it is a problem to provide the method of manufacturing a heat transfer plate whose heat exchange efficiency is high and whose joining portion strength is large; and the heat transfer plate.

A method of manufacturing a heat transfer plate relating to the present invention in order to solve such a problem comprises an insertion process of inserting a heat medium pipe in a concave groove formed in a bottom face of a lid groove open to an obverse of a base member; a lid groove closing process of arranging a lid plate in the lid groove; and a main joining process of moving a main joining rotation tool along butt portions between sidewalls of the lid groove and side faces of the lid plate and applying friction stirring joining, wherein in the main joining process a plastic fluidizing material fluidized due to frictional heat is made to flow in air gap portions formed around the heat medium pipe.

According to such a manufacturing method, by a plastic fluidizing material being made to flow in air gap portions, it is possible to embed the air gap portions; therefore, it is possible to efficiently transfer heat between a heat medium pipe, a base member around it, and a lid plate. Thus it is possible to produce a heat transfer plate whose heat exchange efficiency is high, and for example, to transfer heat released from the heat medium pipe to the base member and the lid plate around the pipe. Furthermore, because the base member and the lid plate are joined by friction stirring joining, it is possible to increase a joining strength of the heat transfer plate.

Furthermore, in the main joining process, a top end of the main joining rotation tool is preferably inserted deeper than a bottom face of the lid groove. Furthermore, in the main joining process, the most adjacent distance between the top end of the main joining rotation tool and a virtual vertical face contacting the heat medium pipe is preferably 1 to 3 mm. According to such a manufacturing method, it is possible to make a plastic fluidizing material more surely flow in air gap portions.

Furthermore, after the main joining process, there are preferably included an upper lid groove closing process of arranging an upper lid plate in an upper lid groove formed on a more obverse side and wider than the lid groove; and an upper lid joining process of moving a joining rotation tool along upper butt portions between sidewalls of the upper lid groove and side faces of the upper lid plate and applying friction stirring joining.

According to such a manufacturing method, because an upper lid plate wider than a lid plate is used on an obverse of the lid plate and friction stirring joining is further applied, it is possible to arrange a heat medium pipe at a deeper position.

Furthermore, a heat transfer plate relating to the invention comprises a base member having a lid groove open to an obverse thereof and a concave groove open to a bottom face of the lid groove; a heat medium pipe inserted in the concave groove; and a lid plate arranged in the lid groove, wherein friction stirring joining is applied along butt portions between sidewalls of the lid groove and side faces of the lid plate, whereby a plastic fluidizing material fluidized due to frictional heat is flowed in air gap portions formed around the heat medium pipe.

According to such a configuration of the heat transfer plate, because a plastic fluidizing material is made to flow in air gap portions and has embedded the air gap portions, it is possible to increase the heat exchange efficiency of the heat transfer plate. Furthermore, because a base member and a lid plate are joined by friction stirring joining, it is possible to increase the joining strength of the heat transfer plate.

Furthermore, a heat transfer plate relating to the invention comprises a base member having an upper groove formed on a more obverse side and wider than the lid groove; and an upper lid plate arranged in the upper lid groove, wherein friction stirring joining is preferably applied along upper butt portions between sidewalls of the upper lid groove and side faces of the upper lid plate.

According to such a configuration of the heat transfer plate, because an upper lid plate wider than a lid plate is used and friction stirring joining is further applied on an obverse of the lid plate, it is possible to arrange a heat medium pipe at a deeper position.

Furthermore, a method of manufacturing a heat transfer plate relating to the invention comprises an insertion process of inserting a heat medium pipe in a concave groove formed on a bottom face of a lid groove open to an obverse of a base member; a lid groove closing process of arranging a lid plate in the lid groove; and an inflow stirring process of moving an inflow stirring rotation tool along the concave groove on an obverse of the lid plate and making a plastic fluidizing material fluidized due to frictional heat flow in air gap portions formed around the heat medium pipe.

According to such a manufacturing method of the heat transfer plate, by making a plastic fluidizing material in air gap portions, it is possible to embed the air gap portions; therefore, it is possible to efficiently transfer heat between a heat medium pipe, a base member around it, and a lid plate. Thus it is possible to produce the heat transfer plate whose heat transfer efficiency is high, and for example, to pass cooling water through the heat transfer pipe and to efficiently cool the heat transfer plate and an object to be cooled. Furthermore, because the base member and the lid plate are joined by friction stirring joining, it is possible to increase the joining strength of the heat transfer plate.

Furthermore, the method of manufacturing a heat transfer plate relating to the invention preferably further comprises, before the inflow stirring process, a joining process of moving a joining rotation tool along butt portions between sidewalls of the lid groove and side faces of the lid plate and applying friction stirring joining between the base member and the lid plate. According to such a manufacturing method of the heat transfer plate, because it is possible to perform the inflow stirring process in a state of the lid plate being surely fixed, it is possible to produce the heat transfer plate whose machining environment is good and accuracy is high.

Furthermore, in the joining process it is preferable to apply tacking of the lid plate by intermittently performing the friction stirring joining along the butt portions between the sidewalls of the lid groove and the side faces of the lid plate.

According to such a manufacturing method of the heat transfer plate, while labor and time required for the joining process are reduced, it is possible to perform the inflow stirring process in a state of surely fixing the lid plate and to produce the heat transfer plate whose machining environment is good and accuracy is high.

Furthermore, the inflow stirring rotation tool is preferably used which is larger than the joining rotation tool. According to such a manufacturing method of the heat transfer plate, it is possible to perform a plastic fluidization till a portion deeper than a bottom face of a lid plate by an inflow stirring rotation tool, and a plasticized region in friction stirring joining in the joining process is small; therefore, an application thereof is easy.

Furthermore, in the inflow stirring process a top end of the inflow stirring rotation tool is preferably inserted deeper than a bottom face of the lid groove. According to such a manufacturing method of the heat transfer plate, it is possible to perform a plastic fluidization till a portion deeper than a bottom face of a lid plate by the inflow stirring rotation tool.

Furthermore, in the inflow stirring process a plasticized region generated in the joining process is preferably stirred again by the inflow stirring rotation tool. According to such a manufacturing method of the heat transfer plate, it is possible to perform the inflow stirring process in a state of surely fixing a lid plate and to make a plasticized region exposed to an obverse of the heat transfer plate nothing but one by the inflow stirring rotation tool.

Furthermore, the method of manufacturing a heat transfer plate relating to the invention preferably further comprises, after the inflow stirring process, an upper lid groove closing process of arranging an upper lid plate covering the lid plate in an upper lid groove formed on a more obverse side and wider than the lid groove of the base member; and an upper lid joining process of moving a joining rotation tool along upper butt portions between sidewalls of the upper lid groove and side faces of the upper lid plates, and applying friction stirring joining between the base member and the upper lid plate.

According to such a manufacturing method of the heat transfer plate, an upper lid plate wider than a lid plate is used on an obverse of the heat transfer plate and friction stirring joining is further applied, it is possible to arrange a heat medium pipe at a position deeper than the heat transfer plate.

Furthermore, the invention with respect to a method of manufacturing a heat transfer plate where a heat medium pipe for circulating a heat medium for heating or cooling a heat component is housed inside a plate-form base member is characterized by inserting the heat medium pipe in a concave groove open to an obverse of the base member and having a depth size larger than an outer diameter size of the heat medium pipe; inserting a lid plate in an opening of the concave groove in an upper portion of the heat medium pipe inside the concave groove; pressing the lid plate to a bottom portion of the concave groove; thereby plastically deforming the heat medium pipe and making the pipe abut with the concave groove; then fixing the lid plate to the base member by friction stirring joining.

According to such a manufacturing method of the heat transfer plate, because a heat medium pipe is pressed in a state of being completely housed inside a concave groove, the pipe is not deformed outside the concave groove, can be surely deformed into a desired form, further, a contact area between the heat medium pipe and a base member is large, and heat conductivity therebetween is increased. Furthermore, because the base member and a lid plate are joined by friction stirring joining, it is possible to increase the joining strength of the heat transfer plate.

Furthermore, a plastic fluidizing material fluidized due to frictional heat of the friction stirring joining is preferably made to flow in an air gap formed around the heat medium pipe plastically deformed. According to such a manufacturing method of the heat transfer plate, it is possible to further increase a contact property between a heat medium pipe and a base member and to further improve heat conductivity therebetween.

Furthermore, the lid plate is protruded more than an obverse of the base member when it is inserted in an opening of the concave groove, and preferably plastically deforms the heat medium pipe by pressing a top end of a protruded portion of the lid plate as far as the obverse of the base member.

According to such a manufacturing method of the heat transfer plate, because a heat medium pipe is plastically deformed by pressing a top end of a protruded portion of a lid plate as far as an obverse of the base member, it is possible to easily perform a deformation amount control of the heat medium pipe.

Furthermore, a bottom portion of the concave groove is formed like a curved surface, wherein bottom-portion inlet corners of width-directional both ends of the bottom portion are machined to the curved surface, and the heat medium pipe is preferably plastically deformed like an approximate ellipse along the bottom portion of the concave groove.

According to such a manufacturing method of the heat transfer plate, because the bottom portion of the concave groove is formed like a curved surface, and bottom-portion inlet corners of width-directional both ends of the bottom portion are machined to the curved surface, a deformed portion of a heat medium pipe easily follows a concave groove, contact therebetween is increased, and heat conductivity therebetween is improved.

Furthermore, the invention relates to a heat transfer plate where a heat medium pipe for circulating a heat medium for heating or cooling a heat component is housed inside a plate-form base member: the base member comprises a concave groove open to an obverse of the base member and having a depth size larger than an outer diameter size of the heat medium pipe; the heat medium pipe is inserted in the concave groove, presses a lid plate inserted in an opening of the concave groove to a bottom portion of the concave groove, thereby is plastically deformed, and abuts with the bottom portion of the concave groove; and the lid plate is fixed to the base member by friction stirring joining.

According to such a configuration of the heat transfer plate, because a heat medium pipe is pushed in a state of being completely housed inside a concave groove, the pipe is not deformed outside the concave groove, can be surely deformed into a desired form, a contact area between a heat medium pipe and a base member is large, and it is possible to increase heat conductivity therebetween.

According to the method of manufacturing a heat transfer plate relating to the invention, it is possible to produce the heat transfer plate whose heat exchange efficiency is high and whose joining portion strength is large. Furthermore, according to the heat transfer plate relating to the invention, its heat exchange efficiency is high and its joining portion strength is large.

BRIEF DESCRIPTION OF THE DRAWINGS

FIG. 4A is a drawing showing an end mill process and a cutting process; FIG. 4B is a drawing showing an insertion process of inserting a heat medium pipe; FIG. 4C is a drawing showing an lid groove closing process; FIG. 4D is a drawing showing a main joining process; and FIG. 4E is a completion drawing.

FIG. 12A is a drawing showing an end mill process and a cutting process; FIG. 12B is a drawing showing an insertion process of inserting a heat medium pipe; FIG. 12C is a drawing showing an lid groove closing process; FIG. 12D is a drawing showing a joining process; FIG. 12E is an inflow stirring process.

FIG. 16A is a drawing showing a state before an inflow stirring rotation tool of an inflow stirring process being pushed in; and FIG. 16B is a drawing showing a state during the inflow stirring rotation tool being pushed in.

FIG. 17A is an exploded side view; and FIG. 17B is a side view.

FIG. 18A is a side view showing a state of a heat medium pipe and a lid plate being inserted in a base member; FIG. 18B is a side view showing a state of the lid plate and the heat medium pipe being pressed; and FIG. 18C is a side view showing a state of the heat medium pipe being plastically deformed.

FIG. 19A is a side view showing a state of friction stirring joining being applied; and FIG. 19B is a side view showing a state of the friction stirring joining being completed.

FIG. 21A is a side view showing a state of a heat medium pipe and an iron jig (lid plate) being inserted in a base member; FIG. 21B is a side view showing a state of the iron jig and the heat medium pipe being pressed; and FIG. 21C is a side view showing a state of the heat medium pipe being plastically deformed.

FIG. 22A is a side view showing a state of another lid plate being inserted on the heat medium pipe; FIG. 22B is a side view showing a state of friction stirring joining being applied; and FIG. 22C is a side view showing a state of the friction stirring joining being completed.

FIG. 24A is a perspective view; and FIG. 24B is a side view.

BEST MODE(S) FOR CARRYING OUT THE INVENTION

[First Embodiment]

Figure 1:
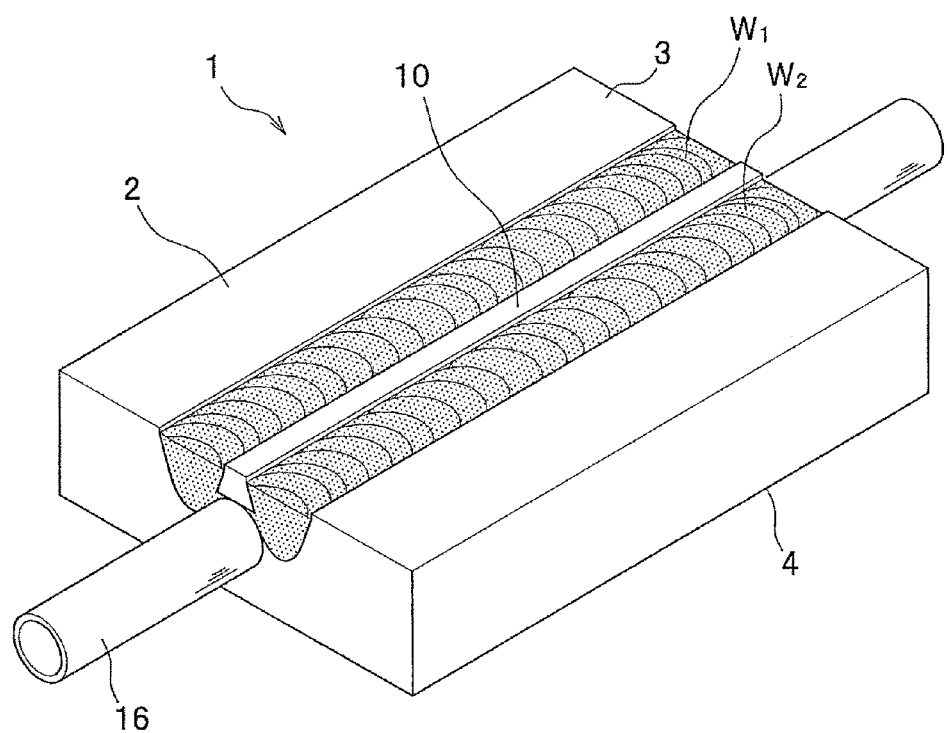
FIG. 1 is a perspective view showing a heat transfer plate relating to a first embodiment of the present invention.
Figure 2:
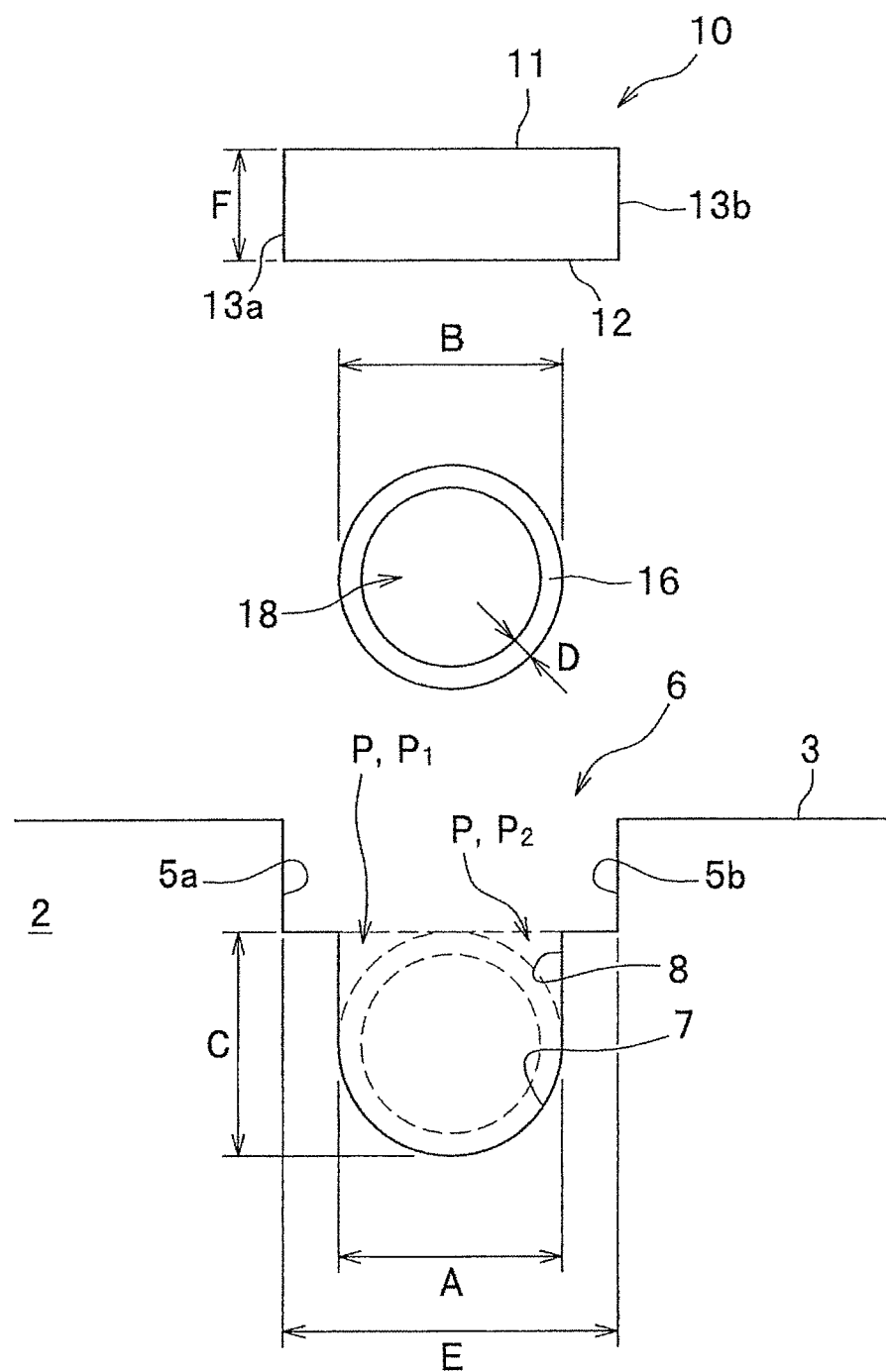
FIG. 2 is an exploded side view showing the heat transfer plate relating to the first embodiment.
Figure 3:
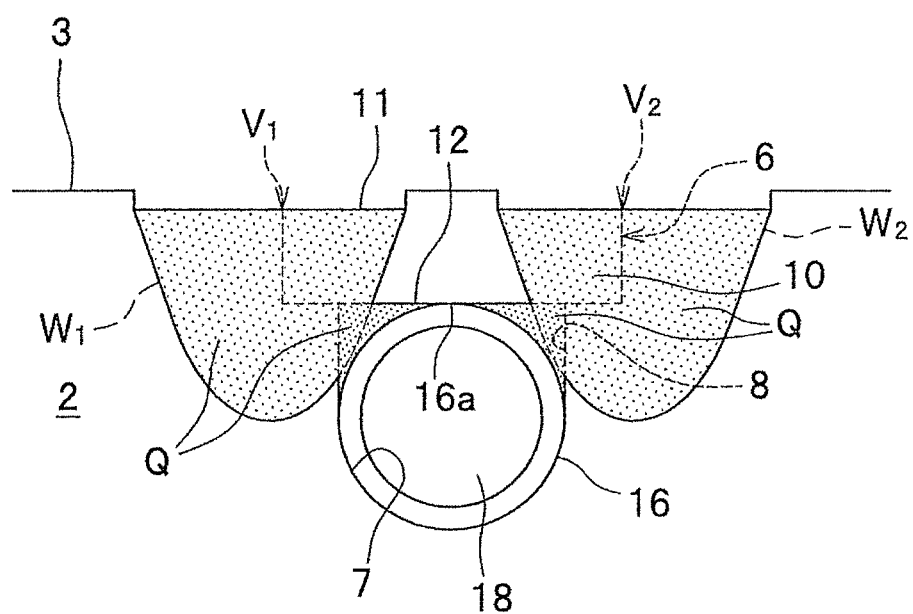
FIG. 3 is an enlarged side view showing the heat transfer plate relating to the first embodiment.

A best mode of the present invention will be described with reference to drawings. FIG. 1 is a perspective view showing a heat transfer plate relating to a first embodiment of the present invention. FIG. 2 is an exploded side view showing the heat transfer plate relating to the first embodiment. FIG. 3 is an enlarged side view showing the heat transfer plate relating to the first embodiment.

A heat transfer plate 1 relating to the first embodiment mainly comprises, as shown in FIGS. 1-3, a base member 2 of a thick plate form having an obverse 3 and a reverse 4, a lid plate 10 arranged in a lid groove 6 open to the obverse 3 of the base member 2, and a heat medium pipe 16 inserted in a concave groove 8 open to a bottom face of the lid groove 6; and is integrally formed by plasticized regions $W_1$, $W_2$ formed by friction stirring joining. Moreover, in the heat transfer plate 1, as shown FIGS. 2 and 3, a plastic fluidized material Q is flowed in an air gap portion P formed by the concave groove 8, an outer face of the heat medium pipe 16, and a lower face 12 of the lid plate 10. Here, it is assumed that a "plasticized region" includes both states: a state of being heated due to frictional heat of a rotation tool and actually plasticized; and a state of the rotation tool having passed through and the region being returned to a room temperature.

The base member 2 plays, as shown in FIG. 2, any role of transferring heat of a heat medium flowing through the heat medium pipe 16 outside and transferring external heat to the heat medium flowing through the pipe 16. The lid groove 6 is depressedly provided in the obverse 3 of the base member 2, and the concave groove 8 narrower than the lid groove 6 is depressedly provided in the middle of the bottom face of the lid groove 6. The lid groove 6 is a portion, where the lid plate 10 is arranged, and is continuously formed over a longitudinal direction of the base member 2. The lid groove 6 presents a rectangle in section view, and comprises sidewalls 5a, 5b vertically rising from the bottom face of the lid groove 6. The concave groove 8 is a portion, where the heat medium pipe 16 is inserted, and is continuously formed over the longitudinal direction of the base member 2. The concave groove 8 is a groove like a U letter in section view, whose upper side is open, and a curved surface 7 of a semicircle is formed at a lower end of the groove 8. A width of an opening of the concave groove 8 is formed, as shown in FIG. 3, of a width A approximately equivalent to a diameter of the curved surface 7. Furthermore, it is assumed that a width of the lid groove 6 is formed of a groove width E and a depth of the concave groove 8 is formed of a depth C. In addition, the base member 2 is formed, for example, of an aluminum alloy (JIS (Japanese Industrial Standards): A6061).

The lid plate 10 consists of a similar aluminum alloy described above, and as shown in FIGS. 2 and 3, has an upper face 11, a lower face 12, a side face 13a, and a side face 13b forming a rectangular section approximately equal to that of the lid groove 6 of the base member 2. Furthermore, a thickness of the lid plate 10 is formed of a lid thickness F.

The lid plate 10 is arranged, as shown in FIG. 3, in the lid groove 6. The side face 13a and side face 13b of the lid plate 10 contact the side walls 5a, 5b of the lid groove 6 in a face-to-face relationship, or are opposed with keeping a minute gap. Here, it is assumed that a butt face between the side face 13a and the sidewall 5a is hereinafter referred to as a butt portion $V_1$; a butt face between the side face 13b and the sidewall 5b is hereinafter referred to as a butt portion $V_2$.

The heat medium pipe 16 is, as shown in FIG. 2, a cylindrical pipe having a hollow portion 18 of a circle in section view. Here, it is assumed that an outer diameter of the heat medium pipe 16 is formed of an outer diameter B; a pipe thickness thereof is formed of a thickness D.

The outer diameter B of the heat medium pipe 16 is formed approximately equivalent to the width A of the concave groove 8, and as shown in FIG. 3, a lower half portion of the heat medium pipe 16 and the curved surface 7 are contacted in a face-to-face relationship. An upper end of the heat medium pipe 16 linearly contacts the lower face 12 of the lid plate 10 at a contact portion 16a. The heat medium pipe 16 is a member configured to circulate a heat medium such as a high temperature liquid and a high temperature gas in the hollow portion 18 and to transfer heat to the base member 2 and the lid plate 10, or a member configured to circulate a heat medium such as cooling water and a cooling gas in the hollow portion 18 and to be heat-transferred from the base member 2 and the lid plate 10. Furthermore, for example, a heater is inserted through the hollow portion 18 of the heat medium pipe 16, and the pipe 16 may also be used as a member for transferring heat generated from the heater to the base member 2 and the lid plate 10.

With respect to the heat medium pipe 16 in the first embodiment, for example, the outer diameter B is formed 12.0 mm, and the thickness D of the pipe is formed 1.0 mm. In addition, in the first embodiment, although the heat medium pipe 16 is assumed to be a circle in section view, it may be a square in section view. In addition, in the first embodiment, although a copper pipe used for the heat medium pipe 16, a pipe of another material may be used.

In addition, in the first embodiment, although the concave groove 8 and the lower half portion of the heat medium pipe 16 are contacted in a face-to-face relationship, and the upper end of the pipe 16 and the lower face 12 of the lid plate 10 are linearly contacted, the invention is not limited thereto. For example, the depth C of the concave groove 8 and the outer diameter B may be in a range of B<C<1.2B. Furthermore, the width A of the concave groove 8 and the outer diameter B of the heat medium pipe 16 may be in a range of B<A<1.1B.

The air gap portion P is, as shown in FIGS. 2 and 3, a space surrounded by the heat medium pipe 16, the concave groove 8, and the lower face 12 of the lid plate 10. In the first embodiment, because the upper end of the heat medium pipe 16 and the lower face 12 of lid plate 10 are contacted at the contact portion 16a, two air gap portions $P_1$, $P_2$ are separated by the portion 16a and formed.

In addition, the air gap portion P is appropriately decided on the basis of a form and the like of the concave groove 8 and the heat medium pipe 16, and the portion P is not limited to the first embodiment.

The plasticized regions $W_1$, $W_2$ are, as shown in FIGS. 2 and 3, regions where parts of the base member 2 and the lid plate 10 are plastically fluidized and integrated in applying friction stirring joining to the but portions $V_1$, $V_2$. In addition, it is assumed that a plasticized region includes both states: a state of being heated due to frictional heat of a main joining rotation tool and actually plasticized; and a state of the rotation tool having passed through and the region being returned to a room temperature. The plasticized regions $W_1$, $W_2$ are shown by hatching portions in FIG. 3.

That is, when friction stirring joining is applied along the plasticized regions $W_1$, $W_2$ with using a main joining rotation tool described later, a metal material of the base member 2 and the lid plate 10 around the butt portions V1, V2 is fluidized due to frictional heat of the rotation tool. At this time, the fluidized metal material (plastic fluidizing material Q) flow in the air gap portions P1, P2 and embed them, and harden and join the base member 2 and the lid plate 10.

When friction stirring joining is applied, it is possible to make the plastic fluidizing material Q favorably flow in the air gap portion P by setting a push-in amount, insertion position, and the like of the main joining rotation tool. Namely, it is preferable to make the main joining rotation tool adjacent to the extent that the heat medium pipe 16 is not crushed, and to make the plastic fluidizing material Q flow in the air gap portion P without a gap. The push-in amount and the like of the main joining rotation tool will be described later.

According to the heat transfer plate 1 thus described, the base member 2 and the lid plate 10 are plastically fluidized in the plasticized regions $W_1$, $W_2$ by the friction stirring joining of both metal materials, and the plastic fluidizing material Q is flowed in the air gap portion P. Thus it is possible to join the base member 2 and the lid plate 10, and to embed the air gap portion P. Furthermore, in the friction stirring joining the heat medium pipe 16 is pressurized by a bottom face of a tool body (shoulder) of the main joining rotation tool described later, it is possible to contact the pipe 16 with the curved surface 7 of the concave groove 8 in a face-to-face relationship. Thus it is possible to efficiently transfer heat from a heat medium circulating in the heat medium pipe 16 to the base member 2 and the lid plate 10, or heat of the base member 2 and the lid plate 10 to the heat medium.

Figure 4A:
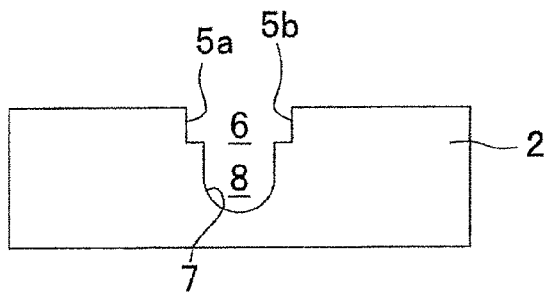
FIGS. 4A-4E are side views showing a method of manufacturing the heat transfer plate relating to the first embodiment.
Figure 4B:
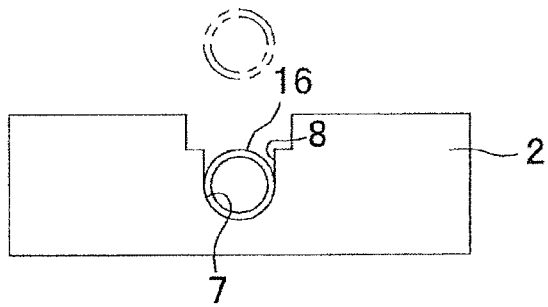
Figure 4C:
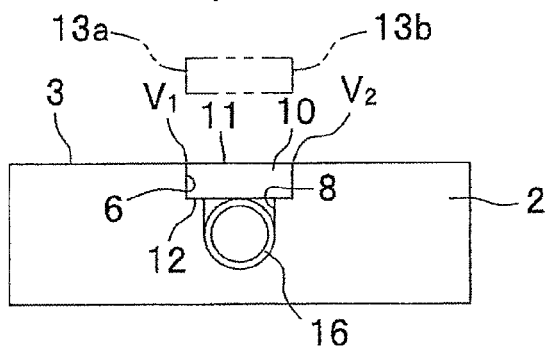
Figure 4D:
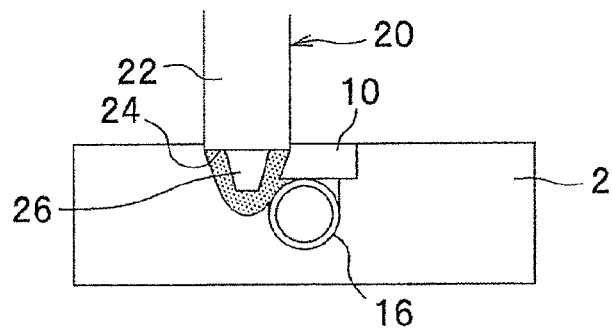
Figure 4E:
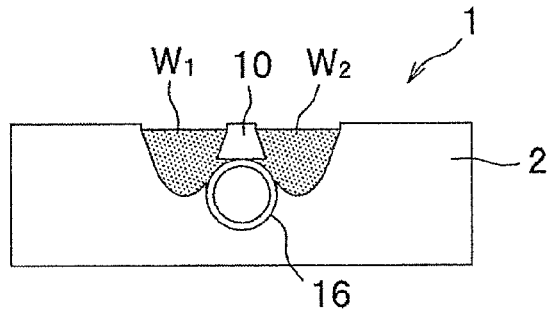

Next will be described a method of manufacturing the heat transfer plate 1, using FIGS. 4A-4E. FIGS. 4A-4E are side views showing a method of manufacturing the heat transfer plate relating to the first embodiment; FIG. 4A is a drawing showing an end mill process and a cutting process; FIG. 4B is a drawing showing an insertion process of inserting a heat medium pipe; FIG. 4C is a drawing showing an lid groove closing process; FIG. 4D is a drawing showing a main joining process; and FIG. 4E is a completion drawing.

The method of manufacturing the heat transfer plate 1 relating to the first embodiment includes an end mill process and cutting process of forming the base member 2; an insertion process of inserting the heat medium pipe 16 in the concave groove 8 formed in the base member 2; a lid groove closing process of arranging the lid plate 10 in the lid groove 6; and a main joining process of moving a main joining rotation tool 20 along the butt portions $V_1$, $V_2$ and applying friction stirring joining.

(End Mill Process and Cutting Process)

Firstly, as shown in FIG. 4A, by known end mill machining, the lid groove 6 is formed on a thick plate member. Then in a bottom face of the lid groove 6 is formed the concave groove 8 comprising a semicircular section by cutting and the like. Thus the base member 2 comprising the lid groove 6 and the concave groove 8 open to the bottom face of the lid groove 6 is formed. The concave groove 8 comprises the curved surface 7 of a semicircle in section at a lower half portion of the groove 8 and is open upward from an upper end of the curved surface 7 with a constant width.

In addition, in the first embodiment, although the base member 2 is formed by end mill machining and cutting, an extrusion section bar of an aluminum alloy may be used.

(Insertion Process)

Next, as shown in FIG. 4B, the heat medium pipe 16 is inserted in the concave groove 8. A lower half portion of the heat medium pipe 16 contacts the curved surface 7, which forms the lower half portion of the concave groove 8, in a face-to-face relationship.

(Lid Groove Closing Process)

Next, as shown in FIG. 4C, the lid plate 10 consisting of an aluminum alloy is arranged in the lid groove 6 of the base member 2. At this time, the lower face 12 of the lid plate 10 and an upper end of the heat medium pipe 16 are linearly contacted, and the upper face 11 of the lid plate 10 is a same level with the obverse 3 of the base member 2. Furthermore, the butt portions $V_1$, $V_2$ are formed by the sidewalls 5a, 5b of the lid groove 6 (see FIG. 4A) and the side faces 13a, 13b of the lid plate 10.

(Main Joining Process)

Next, as shown in FIG. 4D, friction stirring joining is applied along the butt portions $V_1$, $V_2$. The friction stirring joining is performed with using the known main joining rotation tool 20.

The main joining rotation tool 20 consists, for example, of tool steel; and has a columnar tool body 22, and a pin 26 vertically hanging down through a concentric axis from a center portion of a bottom face 24 of the body 22. The pin 26 is formed like a taper narrower toward a top end thereof. In addition, on a peripheral face of the pin 26 may be formed a plurality of small grooves, not shown, along a axial direction of the axis, and a screw thread along an radial direction of the axis.

Figure 5:
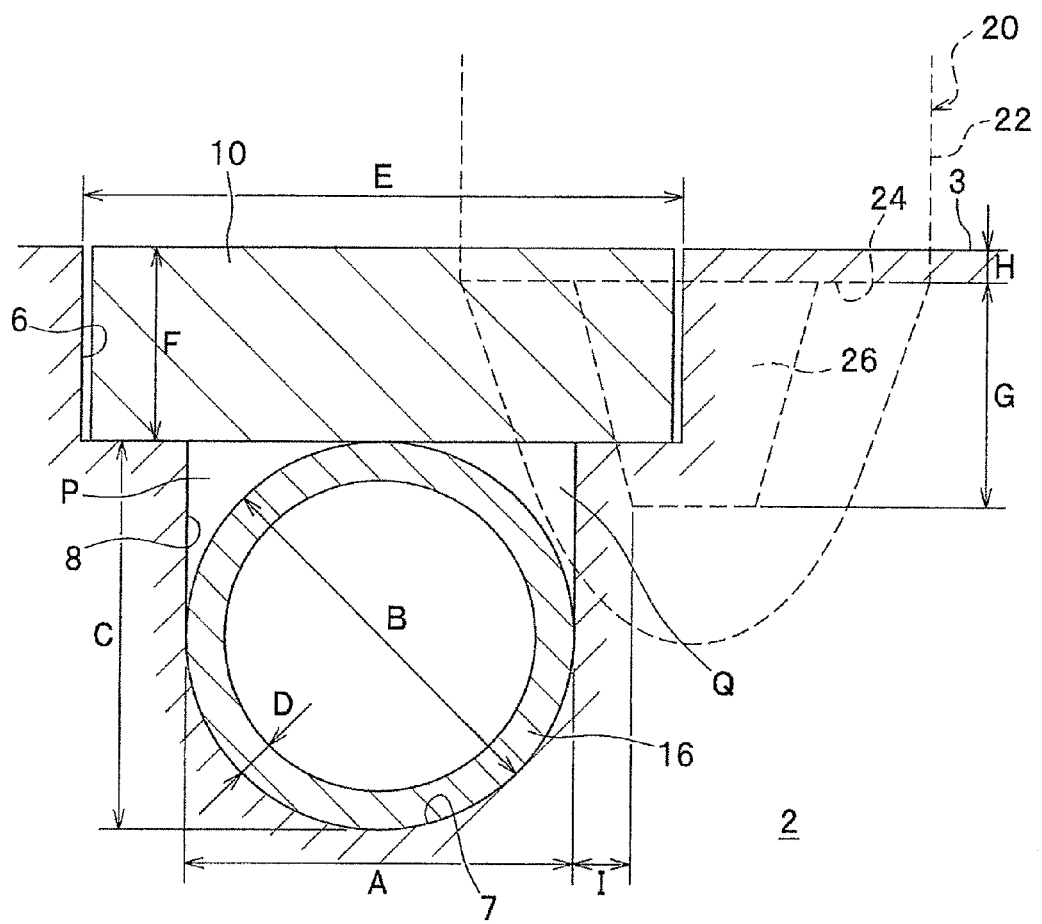
FIG. 5 is a schematic section view showing a position relationship between the heat transfer plate and a main joining rotation tool relating to the first embodiment.

Here, FIG. 5 is a schematic section view showing a position relationship between the heat transfer plate and a main joining rotation tool relating to the first embodiment. For example, with respect to the main joining rotation tool 20, the tool body 22 is 6 to 22 mm in diameter, the pin 26 is 3 to 10 mm in length, and a diameter of a top end of the pin 26 is 2 to 8 mm. Furthermore, a rotation number of the main joining rotation tool 20 is 50 to 1500 rpm, a feed speed is 0.05 to 2 m/min, and a push-in force applied in the axial direction of the tool 20 is 1 kN to 20 kN. Here, as shown in FIG. 5, it is assumed that the length of the pin 26 is a length G and that a distance (pushed-in amount) from the obverse 3 of the base member 2 to the bottom face 24 of the main joining rotation tool 20 is a pushed-in amount H when the main joining rotation tool 20 is pushed in. Furthermore, it is assumed that a most adjacent distance from a virtual vertical plane of the heat medium pipe 16 to the top end of the pin 26 is an offset amount I. In addition, a form and the like of the main joining rotation tool 20 described above are absolutely exemplifications and not limited thereto.

In the main joining process the main joining rotation tool 20 rotating at a high speed is pushed in each of the butt portions $V_1$, $V_2$ in a state of the base member 2 and the lid plate 10 being constrained by a jig not shown, and is moved along each of the butt portions $V_1$, $V_2$. By the pin 26 rotating at the high speed, an aluminum alloy material around the pin 26 is heated due to frictional heat and fluidized. Then this fluidized metal material (plastic fluidizing material Q) flows in the air gap portion P. That is, the fluidized plastic fluidizing material Q is extruded to and pushed in the air gap portion P by a push-in force of the bottom face 24 of the tool body 22 of the main joining rotation tool 20.

Here, the pushed-in amount H (pushed-in length) of the main joining rotation tool 20 is adapted to be a length such that a metal volume of the lid plate 10 pushed aside by the tool body 26 is equivalent to a sum of a volume of a plastically fluidized aluminum alloy material filled in one air gap portion P around the heat medium pipe 16 and a volume of a burr generated on width-directional both sides of the plasticized region $W_1$ ($W_2$).

In addition, after the main joining process, it is available to smoothly form a surface of the plasticized regions $W_1$, $W_2$ by removing the burrs generated on the width-directional both sides of the plasticized regions $W_1$, $W_2$, by any means of cutting and face-machining.

According to the method of manufacturing the heat transfer plate 1, the plasticized regions $W_1$, $W_2$ are formed along the butt portions $V_1$, $V_2$, and the heat medium pipe 16 is closed by the base member 2 and the lid plate 10. Moreover, because the plastic fluidizing material Q is made to flow in the air gap portion P and the portion P is filled, it is possible to form the heat transfer plate 1 whose heat exchange efficiency is high. Furthermore, because the base member 2 and the lid plate 10 are joined by friction stirring joining, it is possible to increase a joining strength of the heat transfer plate. The thickness of the lid plate 10, the pushed-in amount H of the main joining rotation tool 20, and the like will be described in detail in examples.

Figure 6:
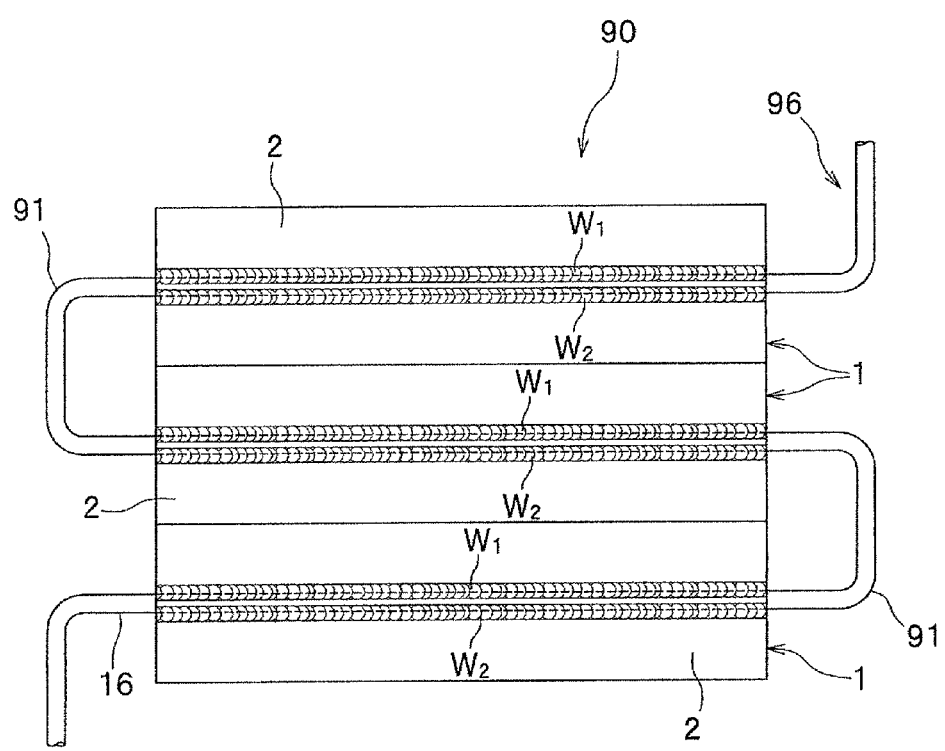
FIG. 6 is a plan view showing a heat transfer unit where the heat transfer plates relating to the first embodiment are used.

FIG. 6 is a plan view showing a heat transfer unit where the heat transfer plates relating to the first embodiment are used. The heat transfer plate 1 is used, for example as shown in FIG. 6, by connecting a plurality of the heat transfer plates 1 and forming a heat transfer unit 90. The heat transfer unit 90 is formed by providing a plurality of the heat transfer plates 1 side by side in a short direction of the base members 2, and by connecting the heat medium pipe 16 protruded from longitudinal-directional both sides of each base member 2 by means of a connection pipe 91 of a U-letter form in plan view. According to the heat transfer unit 90 thus described, because a communicated heat transfer pipe 96 is formed, it is possible to speedily cool or heat an object, not shown, in contact with or adjacent to the base member 2 and the lid plate 10 by circulating a heat medium through the pipe 96.

In addition, the connection method of the heat transfer plates 1 is absolutely an exemplification, and it is available to form a heat transfer unit by another connection method. Furthermore, in the heat transfer unit 90, although the connection pipe 91 is exposed outside, it is also available to form the heat medium pipe 16 like an S letter and to house the pipe 16 inside the heat transfer plate 1.

[Second Embodiment]

Figure 7:
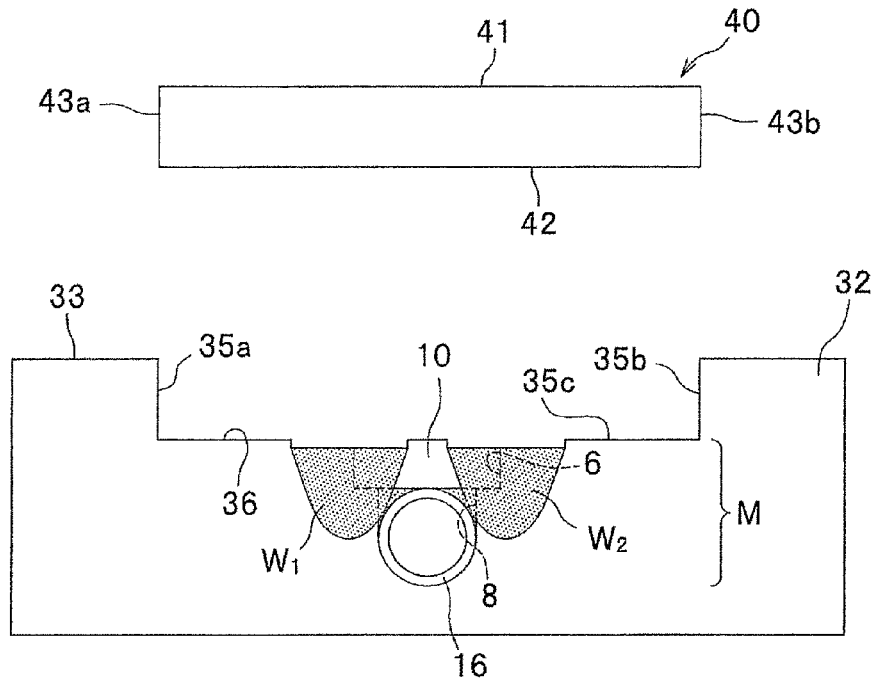
FIG. 7 is an exploded side view showing a heat transfer plate relating to a second embodiment of the invention.
Figure 8:
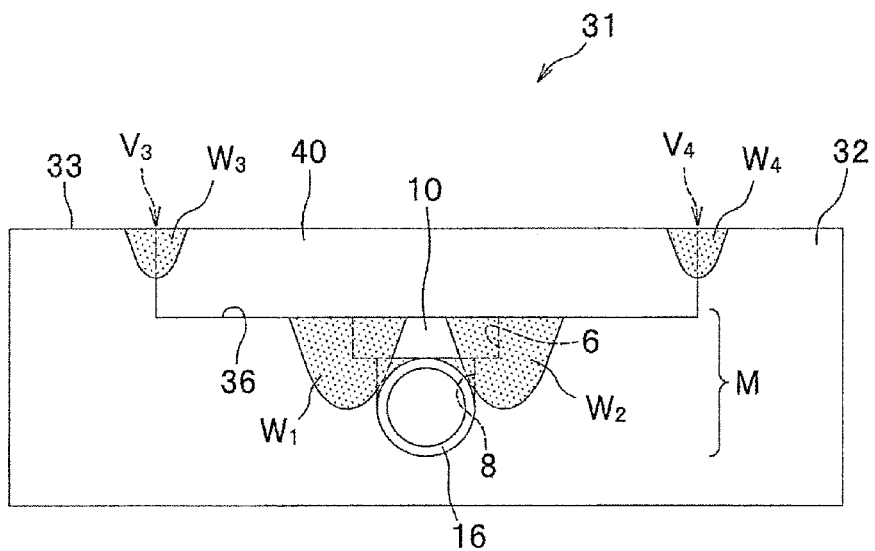
FIG. 8 is a side view showing the heat transfer plate relating to the second embodiment.

Next will be described a heat transfer plate relating to a second embodiment of the invention. FIG. 7 is an exploded side view showing a heat transfer plate relating to the second embodiment. FIG. 8 is a side view showing the heat transfer plate relating to the second embodiment. A heat transfer plate 31 relating to the second embodiment shown in FIG. 8 is different from the first embodiment in a point that: the plate 31 includes a structure approximately equivalent to the heat transfer plate 1 described above; further arranges an upper lid plate 40 on an obverse of the lid plate 10; and friction stirring joining is applied and joined.

In addition, the structure equivalent to the heat transfer plate 1 described above is hereinafter also referred to as a lower lid portion M. Furthermore, with respect to a member repeating that of the heat transfer plate 1 relating to the first embodiment, an equivalent symbol will be added and a duplicate description will be omitted.

The heat transfer plate 31 comprises a base member 32, the heat medium pipe 16 inserted in the concave groove 8, the lid plate 10, and the upper lid plate 40 arranged on the obverse of the lid plate 10, and is integrated at plasticized regions $W_1$ to $W_4$ by friction stirring joining.

The base member 32 consists, for example, of an aluminum alloy, and as shown in FIGS. 7 and 8, has an upper lid groove 36 formed in an obverse 33 of the base member 32 over a longitudinal direction thereof, the lid groove 6 continuously formed in a bottom face 35c of the groove 36 over a longitudinal direction of the member 32; and the concave groove 8 formed in a bottom face of the lid groove 6 over a longitudinal direction thereof. The upper lid groove 36 presents a rectangle in section view, and comprises sidewalls 35a, 35b vertically rising from the bottom face 35c. A width of the upper lid groove 36 is formed wider than that of the lid groove 6.

As shown in FIG. 7, the heat medium pipe 16 is inserted in the concave groove 8 formed at a lower portion of the base member 32, is closed by the lid plate 10, and is joined at the plasticized regions $W_1$, $W_2$ by friction stirring joining. That is, the lower lid portion M formed inside the base member 32 is formed approximately equivalent to the heat transfer plate 1 relating to the first embodiment.

In addition, there is a possibility that any of a step (groove) and a burr is generated on the bottom face 35c of the upper lid groove 36 by performing the friction stirring joining. Accordingly, based on surfaces of the plasticized region $W_1$, $W_2$, it is preferable to apply face machining to the bottom face 35c of the upper lid groove 36 and to smoothly form the face 35c. Thus it is possible to arrange the lower face 42 of the upper lid plate 40 and the bottom face 35c of the upper lid groove 36 without a gap.

The upper lid plate 40 consists, for example, of an aluminum alloy, and as shown in FIGS. 7 and 8, forms a rectangular section approximately equal to the section of the upper lid groove 36, and has side faces 43a, 43b vertically formed from the lower face 42. The upper lid plate 40 fits in the upper lid groove 36. That is, the side faces 43a, 43b of the upper lid plate 40 are contacted with the sidewalls 35a, 35b of the upper lid groove 36 or are arranged with keeping a minute gap. Here, it is assumed that a butt face between the side face 43a and the sidewall 35a is hereinafter referred to as an upper butt portion $V_3$; and a butt face between the side face 43b and the sidewall 35b is hereinafter referred to as an upper butt portion $V_4$. The upper butt portions $V_3$, $V_4$ are integrated at the plasticized regions $W_3$, $W_4$ by the friction stirring joining.

A method of manufacturing the heat transfer plate 31 includes, after forming the lower plate portion M at the lower portion of the base member 32, a facing process of facing the bottom face 35c of the upper lid groove 36; an upper lid groove closing process of arranging the upper plate 40; and an upper lid main joining process of applying friction stirring joining along the upper butt portions $V_3$, $V_4$.

The facing process is a process of cutting and removing any of a step (groove) and a burr formed on the bottom face 35c of the upper lid groove 36, and smoothing the face 35c.

In the upper lid groove closing process, after the facing process is performed, the upper lid plate 40 is arranged on the bottom face of the upper lid groove 36. By performing the facing process, it is possible to arrange the lower face 42 of the upper lid plate 40 and the bottom face of the upper lid groove 36 without a gap.

In the upper lid main joining process a joining rotation tool (not shown) is moved along the upper butt portions $V_3$, $V_4$, and friction stirring joining is applied. An embedded depth of the joining rotation tool in the upper lid main joining process may be appropriately set by considering a pin length of the rotation tool and the thickness F of the upper lid plate 40. In addition, in the upper lid main joining process the main joining rotation tool 20 may be used.

According to the heat transfer plate 31 relating to the second embodiment, it is possible to arrange the heat medium pipe 16 at a deeper position by further arranging the upper lid plate 40 on the lower lid portion M and applying friction stirring joining.

Thus although the first and second embodiments relating to the invention have been described, the invention is not limited thereto; it is possible to appropriately change them without deviating from the spirit and scope of the invention. For example, in the first and second embodiments, although the lid plate 10 and the upper lid plate 40 are arranged on the upper faces of the base members 2, 32, they may also be arranged on the lower faces thereof.

[Third Embodiment]

Figure 9:
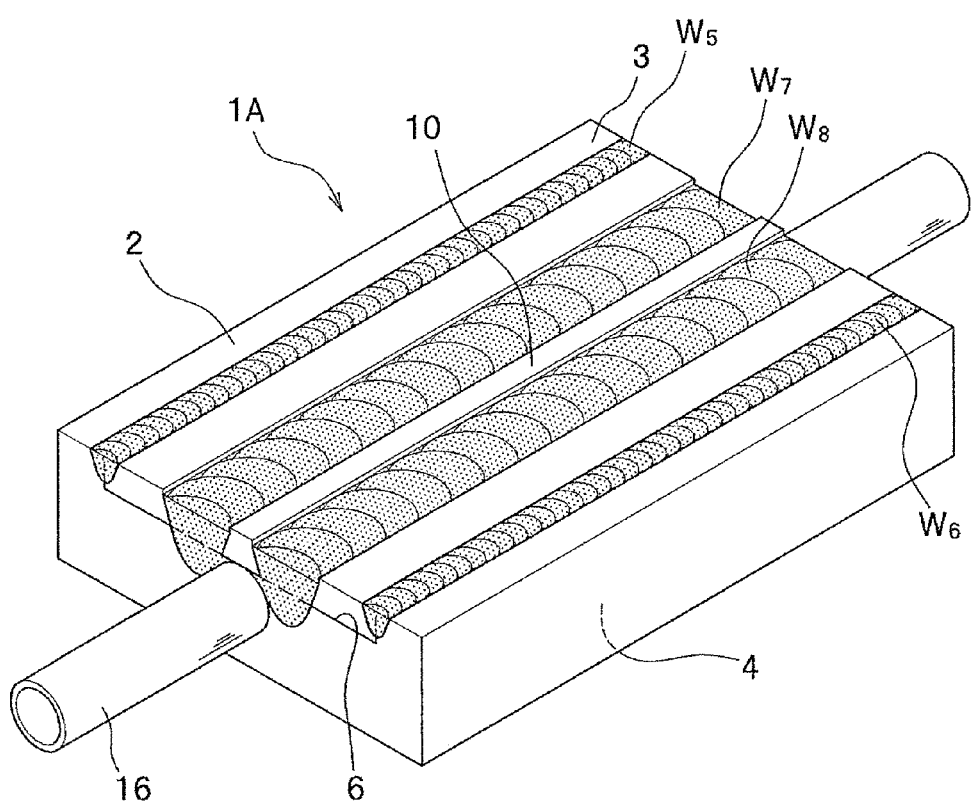
FIG. 9 is a perspective view showing a heat transfer plate relating to a third embodiment of the invention.
Figure 10:
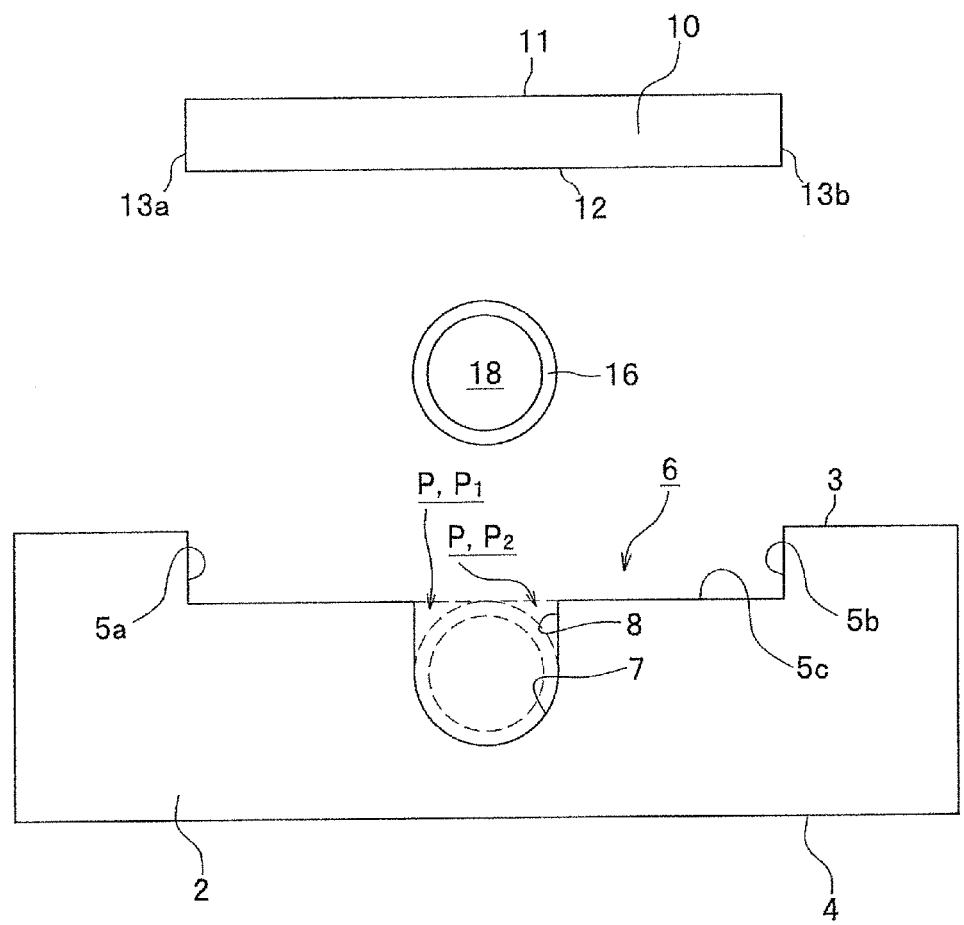
FIG. 10 is an exploded side view showing the heat transfer plate relating to the third embodiment.
Figure 11:
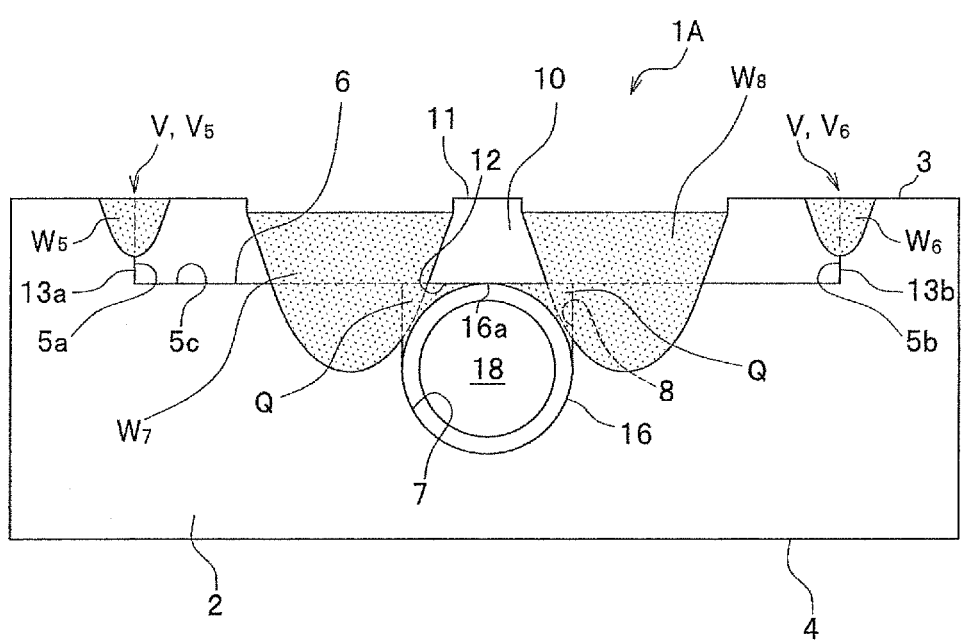
FIG. 11 is a side view showing the heat transfer plate relating to the third embodiment.

A third embodiment of the invention will be described in detail with reference to drawings. FIG. 9 is a perspective view showing a heat transfer plate relating to the third embodiment. FIG. 10 is an exploded side view showing the heat transfer plate relating to the third embodiment. FIG. 11 is a side view showing the heat transfer plate relating to the third embodiment.

A heat transfer plate 1A relating to the third embodiment mainly comprises, as shown in FIGS. 9-11, the base member 2 of a thick plate having the obverse 3 and the reverse 4; the lid plate 10 arranged in the lid groove 6 open to the obverse 3 of the base member 2; and the heat medium pipe 16 inserted in the concave groove 8 open to a bottom face of the lid groove 6. The base member 2 and the lid plate 10 are integrally formed by plasticized regions $W_5$, $W_6$ formed by means of friction stirring joining. Here, it is assumed that a "plasticized region" includes both states: a state of being heated due to frictional heat of a rotation tool and actually plasticized; and a state of the rotation tool having passed through and the region being returned to a room temperature. The plasticized regions $W_5$, $W_6$ are configured along butt portions $V_5$, $V_6$ between the sidewalls 5a, 5b of the lid groove 6 and the side faces 13a, 13b of the lid plate 10, and are generated by moving a joining rotation tool 200 (see FIG. 12D) along the butt portions $V_5$, $V_6$. On one hand, in the lid plate 10 are generated second plasticized regions $W_7$, $W_8$ deeper than the plasticized regions $W_5$, $W_6$ and reaching as far as the base member 2. The plasticized regions $W_7$, $W_8$ are generated by moving an inflow stirring joining rotation tool 250 (see FIG. 12E) on a surface of the lid plate 10 along the concave groove 8 below; and by the plastic fluidizing material Q flowing in as far as the air gap portion P formed around the heat medium pipe 16.

The base member 2 is formed, for example, of an aluminum alloy (JIS: A6061). The base member 2 plays any role of transferring heat of a heat medium, which flows through the heat medium pipe 16, outside, and transferring external heat to the heat medium flowing through the pipe 16; and as shown in FIG. 10, houses the heat medium pipe 16 inside. The lid groove 6 is depressedly provided in the obverse 3 of the base member 2, and the concave groove 8 narrower than the lid groove 6 is depressedly provided in the middle of the bottom face of the lid groove 6. The lid groove 6 is a portion, where the lid plate 10 is arranged, and is continuously formed over a longitudinal direction of the base member 2. The lid groove 6 presents a rectangle in section view, and comprises sidewalls 5a, 5b vertically rising from the bottom face of the lid groove 6. The concave groove 8 is a portion, where the heat medium pipe 16 is inserted, and is continuously formed over the longitudinal direction of the base member 2. The concave groove 8 is a groove like a U letter in section view, whose upper side is open, and the curved surface 7 having a curvature radius equivalent to an outer periphery of the heat medium pipe 16 is formed at a lower end of the groove 8. An opening portion of the concave groove 8 is formed of a width approximately equivalent to an outer peripheral diameter of the heat medium pipe 16.

The lid plate 10 consists of a similar aluminum alloy, and as shown in FIGS. 10 and 11, has the upper face (obverse) 11, the lower face 12, the side face 13a, and the side face 13b forming a rectangular section approximately equal to that of the lid groove 6 of the base member 2. The lid plate 10 is, as shown in FIG. 11, inserted and arranged in the lid groove 6. The side faces 13a, 13b of the lid plate 10 contact the side walls 5a, 5b of the lid groove 6 in a face-to-face relationship, or are opposed with keeping a minute gap. Here, it is assumed that a joining face between the side face 13a and the sidewall 5a is hereinafter referred to as a butt portion $V_5$; a joining face between the side face 13b and the sidewall 5b is hereinafter referred to as a butt portion $V_6$.

The heat medium pipe 16 is configured, for example, with a copper pipe, and as shown in FIG. 10, is a cylindrical pipe having a hollow portion 18 of a circle in section view. An outer diameter of the heat medium pipe 16 is formed approximately equivalent to a width of the concave groove 8, and as shown in FIG. 11, a lower half portion of the heat medium pipe 16 and the curved surface 7 of the groove 8 are contacted in a face-to-face relationship. An upper end of the heat medium pipe 16 linearly contacts the lower face 12 of the lid plate 10 at the contact portion 16a. The heat medium pipe 16 is a member configured to circulate a heat medium such as a high temperature liquid and a high temperature gas in the hollow portion 18 and to transfer heat to the base member 2 and the lid plate 10; or a member configured to circulate a heat medium such as cooling water and a cooling gas in the hollow portion 18 and to be heat-transferred from the base member 2 and the lid plate 10. Furthermore, for example, a heater is inserted through the hollow portion 18 of the heat medium pipe 16, and the pipe 16 may also be used as a member for transferring heat generated from the heater to the base member 2 and the lid plate 10.

In addition, in the third embodiment the concave groove 8 and the lower half portion of the heat medium pipe 16 are contacted in a face-to-face relationship, and the upper end of the pipe 16 and the lower face 12 of the lid plate 10 are linearly contacted; the invention is not limited thereto. For example, a depth of the concave groove 8 may be equivalent to the outer diameter of the heat medium pipe 16, or be a range equal to or less than 1.1 times.

The air gap portion P formed around the heat medium pipe 16 is, as shown in FIG. 10, a space surrounded by the pipe 16, the concave groove 8, and the lower face 12 of the lid plate 10. In the third embodiment, because the upper end of the heat medium pipe 16 and the lower face 12 of lid plate 10 are contacted at the contact portion 16a, two air gap portions $P_1$, $P_2$ are formed with making the portion 16a their boundary.

In addition, the air gap portion P is appropriately decided on the basis of a form and the like of the concave groove 8 and the heat medium pipe 16, and the portion P is not limited to the embodiments.

The plasticized regions $W_5$, $W_6$ are, as shown in FIGS. 9 and 11, regions where parts of the base member 2 and the lid plate 10 are plastically fluidized and integrated in applying friction stirring joining to the but portions $V_5$, $V_6$. In addition, it is assumed that a plasticized region includes both states: a state of being heated due to frictional heat of a rotation tool and actually plasticized; and a state of the rotation tool having passed through and the region being returned to a room temperature. The plasticized regions $W_5$, $W_6$ are shown by hatching portions in FIG. 11. That is, when the friction stirring joining is applied along the plasticized regions $W_5$, $W_6$ with using the joining rotation tool 200 (see FIG. 12D) described later, metal materials of the base member 2 and the lid plate 10 around the butt portions $V_5$, $V_6$ are fluidized and integrated due to frictional heat of the rotation tool 200, and thereby, are joined.

The plasticized regions $W_7$, $W_8$ are, as shown in FIGS. 9 and 11, generated by moving the inflow stirring rotation tool 250 (see FIG. 12E) on the upper face (obverse) 11 of the lid plate 10 along the concave groove 8 below. In addition, it is assumed that a plasticized region includes both states: a state of being heated due to frictional heat of a rotation tool and actually plasticized; and a state of the rotation tool having passed through and the region being returned to a room temperature. The plasticized regions $W_7$, $W_8$ are generated portions when the plastic fluidizing material Q (parts of the plasticized regions $W_7$, $W_8$) fluidized due to frictional heat by means of rotation of the inflow stirring rotation tool 250 are made to flow in the air gap portion P formed around the heat medium pipe 16. That is, the plasticized regions $W_7$, $W_8$ are regions, wherein parts of the base member 2 and the lid plate 10 are plastically fluidized, flow in the air gap portion P, are integrated, and contact the heat medium pipe 16. The plasticized regions $W_7$, $W_8$ are shown by hatching portions in FIG. 11.

When friction stirring joining is applied, it is possible to make the plastic fluidizing material Q favorably flow in the air gap portion P by setting a pushed-in amount, insertion position, and the like of the inflow stirring rotation tool 250. Namely, it is preferable to make the inflow stirring joining rotation tool 250 approach to the pipe 16 to the extent that the heat medium pipe 16 is not crushed, and to make the plastic fluidizing material Q flow in the air gap portion P without a gap.

According to the heat transfer plate 1A thus described, the base member 2 and the lid plate 10 are plastically fluidized and integrated in the plasticized regions $W_5$, $W_6$ by the friction stirring joining of both metal materials; and in the plasticized regions $W_7$, $W_8$, the plastic fluidizing material Q is flowed in the air gap portion P. Thus it is possible to join the base member 2 and the lid plate 10, and to embed the air gap portion P. Furthermore, in the friction stirring joining, because the heat medium pipe 16 is pressurized through the plastic fluidizing material Q by a bottom face 270 (shoulder) of a tool body 260 of the inflow stirring joining rotation tool 250, it is possible to contact the pipe 16 with the curved surface 7 of the concave groove 8 in a face-to-face relationship. Thus it is possible to efficiently transfer, for example, heat from a heat medium circulating in the heat medium pipe 16 to the base member 2 and the lid plate 10.

Figure 12A:
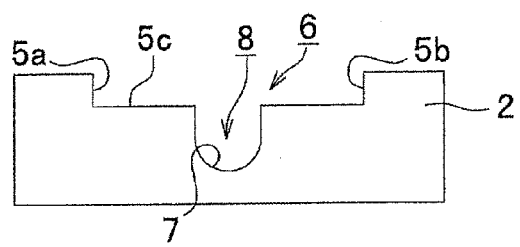
FIGS. 12A-12F are side views showing a method of manufacturing the heat transfer plate relating to the third embodiment.
Figure 12B:
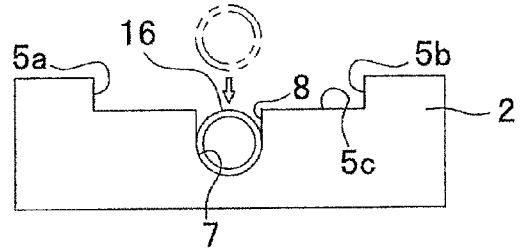
Figure 12C:
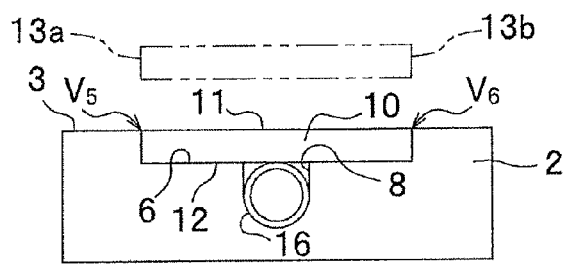
Figure 12D:
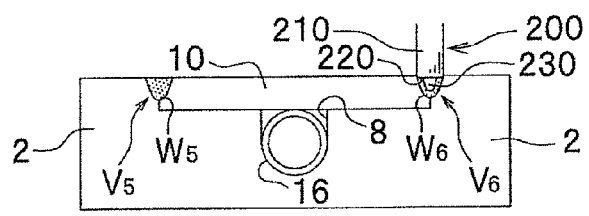
Figure 12E:
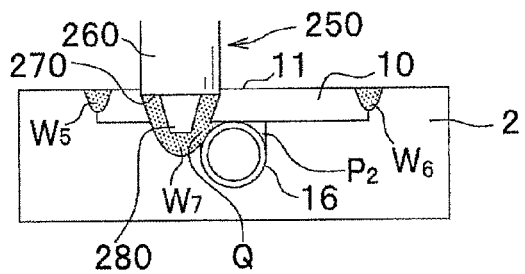

Next will be described a method of manufacturing the heat transfer plate 1A, using FIGS. 12A-12F. FIGS. 12A-12F are side views showing a method of manufacturing the heat transfer plate relating to the third embodiment; FIG. 12A is a drawing showing an end mill process and a cutting process; FIG. 12B is a drawing showing an insertion process of inserting a heat medium pipe; FIG. 12C is a drawing showing an lid groove closing process; FIG. 12D is a drawing showing a joining process; FIG. 12E is an inflow stirring process. FIG. 13 is a plan view showing a heat transfer unit where the heat transfer plates relating to the third embodiment are used.

A method of manufacturing the heat transfer plate 1A relating to the third embodiment includes an end mill process and cutting process of forming the base member 2; an insertion process of inserting the heat medium pipe 16 in the concave groove 8 formed in the base member 2; a lid groove closing process of arranging the lid plate 10 in the lid groove 6; a joining process of moving the joining rotation tool 200 along the butt portions $V_5$, $V_6$ and applying friction stirring joining; and an inflow stirring process of moving the inflow stirring rotation tool 250 on the obverse 11 of the lid plate 10 along the concave groove 8 and making the plastic fluidizing material Q fluidized due to frictional heat flow in the air gap portion P formed around the heat medium pipe 16.

(End Mill Process and Cutting Process)

Firstly, as shown in FIG. 12A, by known end mill machining, the lid groove 6 is formed in a thick plate member. Then in a bottom face of the lid groove 6 is formed the concave groove 8 comprising a semicircular section by cutting and the like. Thus the lid groove 6 and the base member 2 comprising the concave groove 8 open to the bottom face of the lid groove 6 are formed. The concave groove 8 comprises the curved surface 7 of a semicircle in section view at the lower half portion of the groove 8 and is open upward from an upper end of the curved surface 7 with a constant width.

In addition, in the third embodiment, although the base member 2 is formed by end mill machining and cutting, any one of an extrusion section bar and die cast product of an aluminum alloy may be used.

(Insertion Process)

Next, as shown in FIG. 12B, the heat medium pipe 16 is inserted in the concave groove 8. At this time, the lower half portion of the heat medium pipe 16 contacts the curved surface 7, which forms the lower half portion of the concave groove 8, in a face-to-face relationship.

(Lid Groove Closing Process)

Next, as shown in FIG. 12C, the lid plate 10 consisting of an aluminum alloy is arranged in the lid groove 6 of the base member 2. At this time, the lower face 12 of the lid plate 10 and an upper end of the heat medium pipe 16 are linearly contacted, and the upper face 11 of the lid plate 10 is a same level with the obverse 3 of the base member 2. Furthermore, the butt portions $V_5$, $V_6$ are formed by the sidewalls 5a, 5b of the lid groove 6 (see FIG. 12B) and the side faces 13a, 13b of the lid plate 10.

(Joining Process)

Next, as shown in FIG. 12D, friction stirring joining is applied along the butt portions $V_5$, $V_6$. The friction stirring joining is performed with using the joining rotation tool 200 (known rotation tool). The joining rotation tool 20 consists, for example, of tool steel; and has a tool body 210 of a cylindrical form, and a pin 230 vertically hanging down through a concentric axis from a center portion of a bottom face 220 of the body 210. The pin 230 is formed like a taper narrower toward a top end thereof. In addition, on a peripheral face of the pin 230 may be formed a plurality of small grooves, not shown, along an axial direction of the axis, and a screw thread along a radial direction of the axis.

In the friction stirring joining the joining rotation tool 200 rotating at a high speed is pushed in each of the butt portions $V_5$, $V_6$ in a state of the base member 2 and the lid plate 10 being constrained by a jig not shown, and is moved along the butt portions $V_5$, $V_6$. By the pin 230 rotating at the high speed, aluminum alloy materials around the pin 230 are heated due to frictional heat and fluidized, and then are cooled and integrated.

(Inflow stirring Process)

Next, as shown in FIG. 12E, friction stirring joining is applied on the upper face (obverse) 11 of the lid plate 10 along the concave groove 8 below. The inflow stirring process is a process of making the plastic fluidizing material Q fluidized by the friction stirring joining in the air gap portion P (see FIG. 10) formed around the heat medium pipe 16, wherein the friction stirring joining is performed by using the inflow stirring rotation tool 250 (known rotation tool). The inflow stirring rotation tool 250 consists, for example, of tool steel; has a form equivalent to the joining rotation tool 200; and comprises a tool body 260 of a columnar form and a pin 280 vertically hanging down through a concentric axis from a center portion of a bottom face 270 of the body 260. In the third embodiment the inflow stirring rotation tool 250 is used which is larger than the joining rotation tool 200. Specifically, the inflow stirring rotation tool 250 is adopted in size where a lower end of the pin 280 (top end of the inflow stirring rotation tool 250) is lower than a bottom face 5c of the lid groove 6, when the rotation tool 250 is pushed in the upper face 11 of the lid plate 10 and the friction stirring joining is applied.

In the friction stirring joining of the inflow stirring process, the inflow stirring rotation tool 250 rotating at a high speed is pushed in the upper face (obverse) 11 of the lid plate 10 and is moved along the concave groove 8 below. The inflow stirring rotation tool 250 is arranged so that a part of a projected portion of the bottom face (shoulder) 270 of the tool body 260 overlaps the air gap portion P of the heat medium pipe 16. At this time, the top end of the inflow stirring rotation tool 250 is inserted deeper than the bottom face 5c of the lid groove 6, and aluminum alloy materials of the lid plate 10 and the base member 2 around the pin 280 are heated and fluidized due to frictional heat. The inflow stirring rotation tool 250 is pushed in so that the bottom face 270 of the tool body 260 is lower than the upper face 11 of the lid plate 10. The pushed-in amount (length) is adapted to be a length such that a metal volume of the lid plate 10 pushed aside by the tool body 260 is equivalent to a sum of a volume of plastically fluidized aluminum alloy materials filled in one air gap portion P around the heat medium pipe 16 and a volume of a burr generated on width-directional both sides of the plasticized region $W_7$ ($W_8$). Then the fluidized plastic fluidizing material Q is extruded to in the air gap portion P and made to flow therein by a push-in force of the bottom face 270 of the tool body 260. After the friction stirring joining in the inflow stirring process, burrs generated on the width-directional both sides of the plasticized region $W_7$, $W_8$ are removed. The friction stirring joining is applied to each of the width-directional both sides of the concave groove 8, and the plastic fluidizing material Q is made to flow in a pair of the air gap portions P1, P2 positioned on the upper side of the heat medium pipe 16.

Figure 12F:
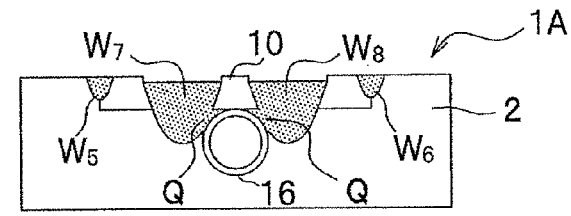
Figure 13:
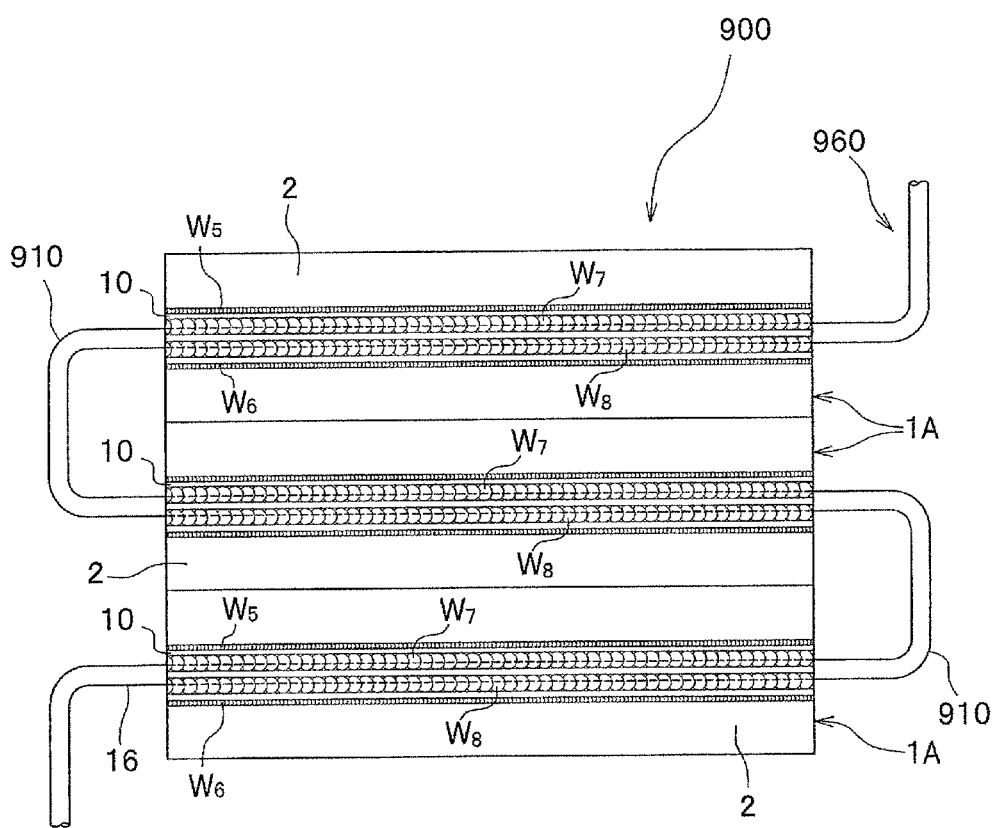
FIG. 13 is a plan view showing a heat transfer unit where the heat transfer plates relating to the third embodiment are used.

According to the method of manufacturing the heat transfer plate 1A, as shown in FIG. 12F, the plasticized region $W_5$, $W_6$ are formed, and the base member 2 and the lid plate 10 are joined; on one hand, the region $W_5$, $W_6$ are formed in the upper face along the concave groove 8, and the heat medium pipe 16 is hermetically closed by the base member 2 and the lid plate 10. Moreover, because the plastic fluidizing material Q is flowed in the air gap portion P and it is filled, the base member 2 and the lid plate 10 are contacted without a gap; therefore, it is possible to form the heat transfer plate 1A whose heat exchange efficiency is high. Furthermore, because the base member 2 and the lid plate 10 are joined by the friction stirring joining, it is possible to increase the joining strength of the heat transfer plate 1A.

Moreover, according to the third embodiment, because the comparatively small joining rotation tool 200 is used at the top end thereof and the lid plate 10 is joined to the base member 2, it is possible in the inflow stirring process to apply the friction stirring joining in a state of the lid plate 10 being surely fixed. Accordingly, it is possible to use the comparatively small joining rotation tool 200 and to stably perform the friction stirring joining where a large push-in force is applied.

In addition, in the third embodiment, although the inflow stirring process is performed after the joining process, it may be performed after the inflow stirring process. At this time, if the lid plate 10 is fixed in a longitudinal direction thereof by a jig not shown, the width direction of the lid plate 10 is fixed by the base member 2; therefore, it is possible to apply the friction stirring joining in the inflow stirring process in a state of the lid plate 10 being surely fixed.

Furthermore, in the third embodiment, although the friction stirring joining is applied over a whole length of the butt portions $V_5$, $V_6$, the invention is not limited thereto; it may be available to intermittently perform the friction stirring joining along the whole length of the butt portions $V_5$, $V_6$ with keeping a predetermined distance and to apply tacking of the lid plate 10 to the base member 2. According to such a method of manufacturing a heat transfer plate, it is possible to reduce labor and time required for a joining process, to perform an inflow stirring process in a state of a lid plate being, surely fixed and, similarly to the operation and effect, to produce a heat transfer plate whose machining environment is good and accuracy is high.

FIG. 13 is a plan view showing a heat transfer unit where the heat transfer plates relating to the third embodiment are used.

The heat transfer plates 1A are used, for example as shown in FIG. 13, by connecting a plurality of the heat transfer plates 1A and forming a heat transfer unit 900. The heat transfer unit 900 is formed by the plurality of the heat transfer plates 1A being provided side by side in a short direction of the base members 2; and by the heat medium pipe 16 protruded from longitudinal-directional both sides of each base member 2 being connected with a connection pipe 910 of a U-letter form in plan view. According to the heat transfer unit 900 thus described, because a communicated heat transfer pipe 960 is formed, it is possible to speedily cool or heat an object, not shown, in contact with or adjacent to the base member 2 and the lid plate 10 by circulating a heat medium through the pipe 960.

In addition, the connection method of the heat transfer plates 1A is an exemplification, and it is available to form a heat transfer unit by another connection method. Furthermore, in the heat transfer unit 900, although the connection pipe 910 is exposed outside, it is also available to form the heat medium pipe 16 like an S letter and to house the pipe 16 inside the heat transfer plates 1A.

Figure 14:
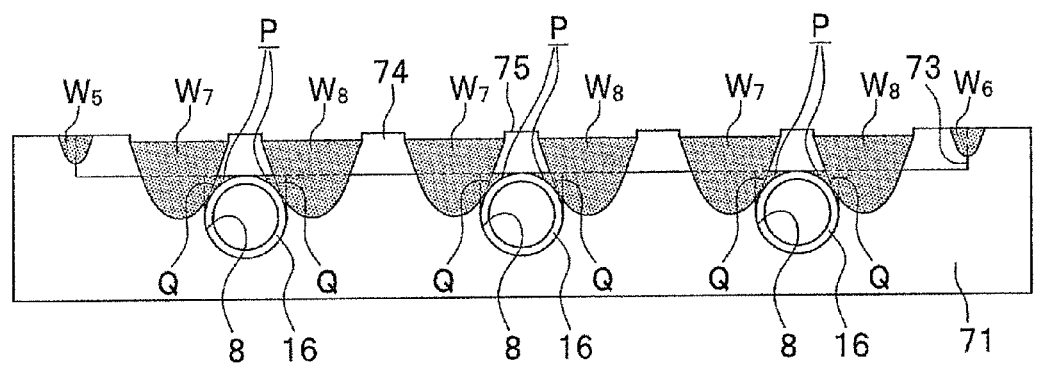
FIG. 14 is a side view showing a modified example of a heat transfer plate.

Moreover, in the third embodiment, although the heat transfer unit 900 is formed by connecting the plurality of the heat transfer plates 1A through the connection pipe 910, the invention is not limited thereto. For example, as shown in FIG. 14, it is also available to make the plastic fluidizing material Q flow in the air gap portion P of the heat medium pipe 16 by forming a lid groove 73 having a plurality of the concave grooves 8, 8 . . . in one base member 71, fixing one lid plate 74 to the base member 71 by means of a joining rotation tool (not shown), and moving an inflow stirring rotation tool (not shown) from an upper face (obverse) 75 of the lid plate 74 along each concave groove 8. Thus it is possible to fix a plurality of the heat medium pipes 16, 16 . . . by only once performing a joining process of the lid plate 74.

[Fourth Embodiment]

Figure 15:
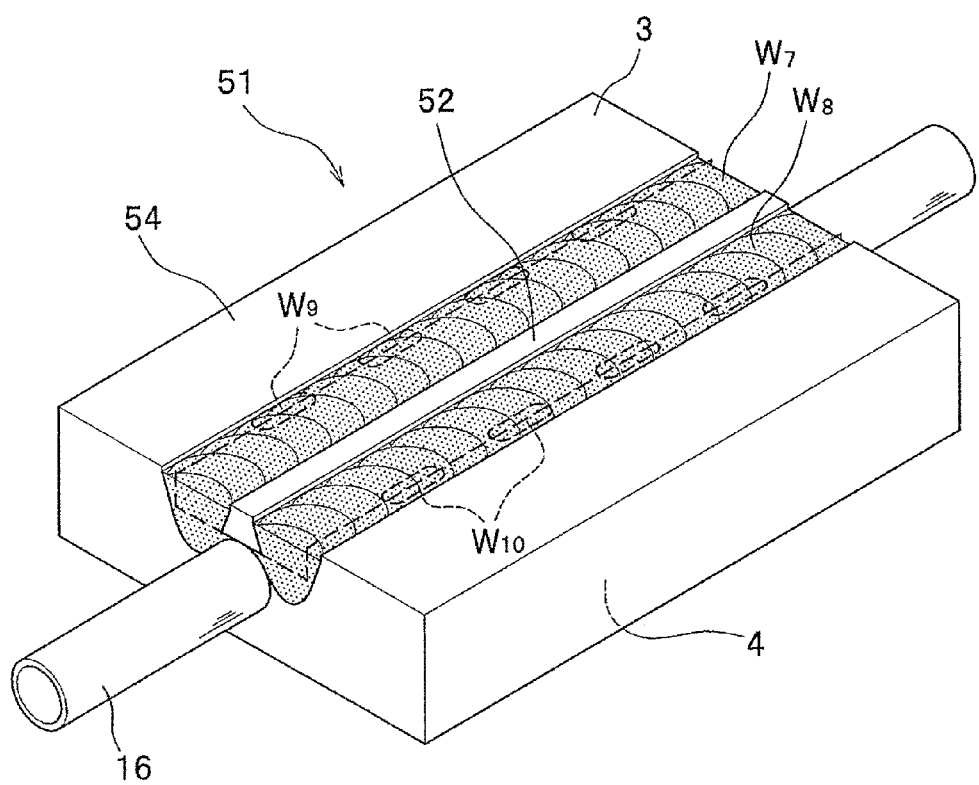
FIG. 15 is a perspective view showing a heat transfer plate relating to a fourth embodiment of the invention.
Figure 16A:
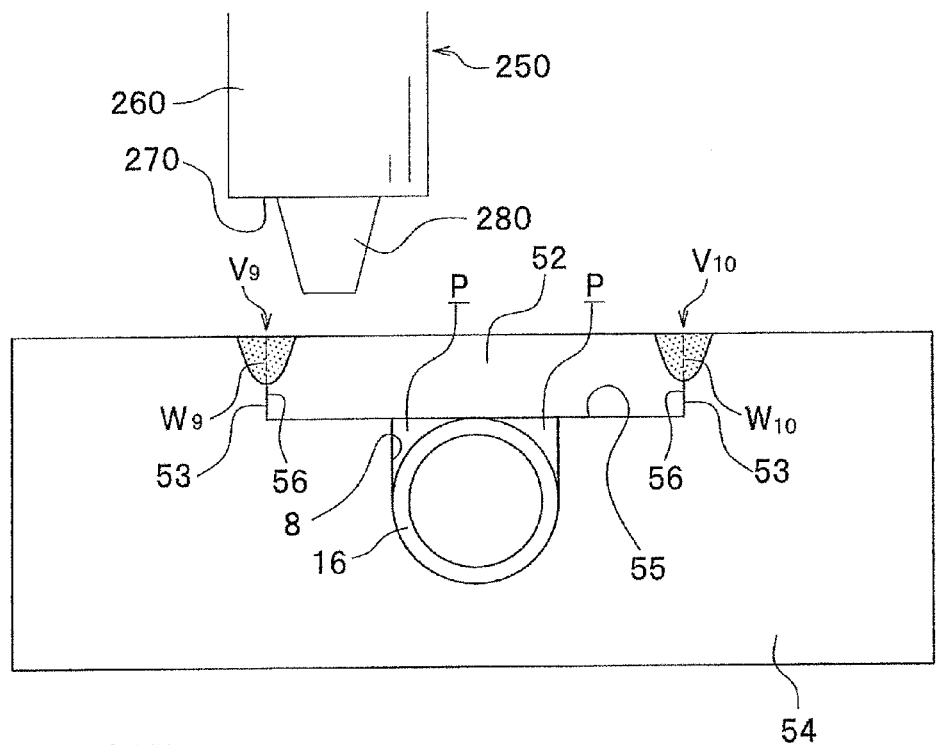
FIGS. 16A and 16B are side views showing a method of manufacturing the heat transfer plate relating to the fourth embodiment.
Figure 16B:
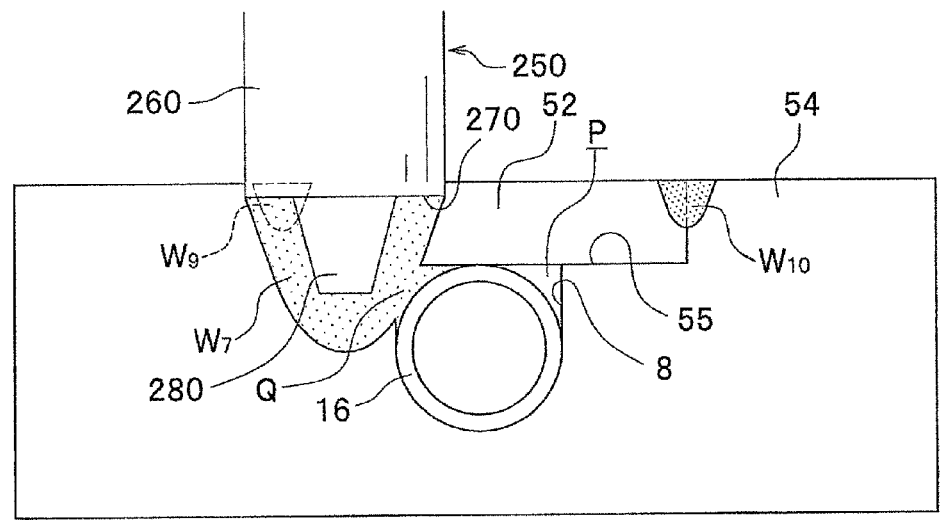

Next will be described a heat transfer plate 1A relating to a fourth embodiment of the invention. FIG. 15 is a perspective view showing a heat transfer plate relating to the fourth embodiment. FIGS. 16A and 16B are side views showing a method of manufacturing the heat transfer plate relating to the fourth embodiment; FIG. 16A is a drawing showing a state before an inflow stirring rotation tool of an inflow stirring process being pushed in; and FIG. 16B is a drawing showing a state during the inflow stirring rotation tool being pushed in.

As shown in FIGS. 15, 16A, and 16B, in a heat transfer plate 51 relating to the fourth embodiment, a lid plate 52 and a lid groove 55 of a base member 54 are formed narrower in width than those of the third embodiment. Specifically, widths of the lid plate 52 and the lid groove 55 of the base member 54 are formed so that butt portions $V_9$, $V_{10}$ between side faces 53 of the lid plate 52 and sidewalls 56 of the lid groove 55 of the base member 54 are included in the plasticized regions $W_7$, $W_8$ generated by friction stirring joining in an inflow stirring process. That is, it is adapted that: the inflow stirring rotation tool 250 moves on plasticized regions $W_9$, $W_{10}$, which are generated in a joining process, in the inflow stirring process; and the plasticized regions $W_9$, $W_{10}$ are stirred again. As the inflow stirring rotation tool 250, one is used similar to that of the third embodiment. In addition, because other configurations are same as those of the third embodiment, a same symbol will be added and a description thereof will be omitted.

Next will be described a method of manufacturing the heat transfer plate 51 relating to the fourth embodiment. The method of manufacturing the heat transfer plate 51 relating to the fourth embodiment also includes an end mill process and cutting process of forming the base member 54; an insertion process of inserting the heat medium pipe 16 in the concave groove 8 formed in the base member 54; a lid groove closing process of arranging the lid plate in the lid groove 55; a joining process of moving a joining rotation tool (not shown) along the butt portions $V_9$, $V_{10}$ and applying friction stirring joining; and an inflow stirring process of moving the inflow stirring process rotation tool 250 (see FIGS. 16A and 16B) in an obverse of the lid plate 52 along the concave groove 8 and making the plastic fluidizing material Q fluidized due to frictional heat flow in the air gap portion P formed around the heat medium pipe 16.

The end mill process, the cutting process, the insertion process, and the lid groove closing process are similar to those of the third embodiment except for a configuration of the widths of the lid plate 52 and the lid groove 55 of the base member 54 being narrower.

In the joining process, as shown in FIGS. 15 and 16A, friction stirring joining is intermittently performed along the butt portions $V_9$, $V_{10}$ with keeping a predetermined distance, the plasticized regions $W_9$, $W_{10}$ are formed like broken lines, and the lid plate 52 is tacked to the base member 54. A joining rotation tool (not shown) used at this time is similar to the joining rotation tool 200 of the third embodiment, and is smaller than the inflow stirring rotation tool 250.

Next, as shown in FIG. 16B, friction stirring joining is applied in an upper face (obverse) of the lid plate 52 along the concave groove 8 below. The inflow stirring process is, similarly to that of the third embodiment, a process of making the plastic fluidizing material Q fluidized by the friction stirring joining in the air gap portion P formed around the heat medium pipe 16, wherein the friction stirring joining is performed by the inflow stirring rotation tool 250 (known rotation tool).

The friction stirring joining in the inflow stirring process pushes the inflow stirring rotation tool 250 rotating at a high speed in the upper face (obverse) of the lid plate 52, and moves the tool 250 along the concave groove 8 below. The inflow stirring rotation tool 250 is arranged so that a part of a projected portion of the bottom face (shoulder) 270 of the tool body 260 overlaps the air gap portion P of the heat medium pipe 16 and the plasticized region $W_9$ ($W_{10}$) formed in the joining process. At this time, the top end of the inflow stirring rotation tool 250 is inserted deeper than the bottom face 5c of the lid groove 6; aluminum alloy materials of the lid plate 52 and the base member 54 around the pin 280 are heated and fluidized due to frictional heat; and the fluidized plastic fluidizing material Q is extruded to the air gap portion P and made to flow therein by a push-in force of the bottom face 270 of the tool body 260 of the inflow stirring rotation tool 250. In conjunction with this, the plasticized region $W_9$ ($W_{10}$) is included in the plasticized regions $W_7$ ($W_8$) generated by the inflow stirring rotation tool 250, and is stirred again.

According to the method of manufacturing the heat transfer plate 51, it is possible to stably perform the friction stirring joining in a state of the lid plate 52 being fixed to the base member 54; and, as shown in FIG. 15, the plasticized regions $W_9$, $W_{10}$ are formed along the butt portions $V_9$, $V_{10}$ (see FIG. 16A), the heat medium pipe 16 is hermetically closed by the base member 54 and the lid plate 52, and further, the plasticized regions $W_9$, $W_{10}$ are included in the plasticized regions $W_7$, $W_8$, and the base member 54 and the lid plate 52 are joined. Thus because the plasticized regions $W_9$, $W_{10}$ are stirred again by the inflow stirring rotation tool 250 and included in the plasticized regions $W_7$, $W_8$, it is possible to reduce a plasticized region exposed to the obverse of the heat transfer plate 51.

In addition, in the fourth embodiment, although it is adapted in the joining process to intermittently perform the friction stirring joining along the butt portions $V_9$, $V_{10}$ and to apply the tacking of the lid plate 52 to the base member 54, the joining thereof is not limited to the tacking; the friction stirring joining may also be performed over a whole length of the butt portions $V_9$, $V_{10}$. Thus when the friction stirring joining is performed over the whole length of the butt portions $V_9$, $V_{10}$, it is possible to perform the friction stirring joining in a state of the lid plate 52 being more surely fixed.

[Fifth Embodiment]

Figure 17A:
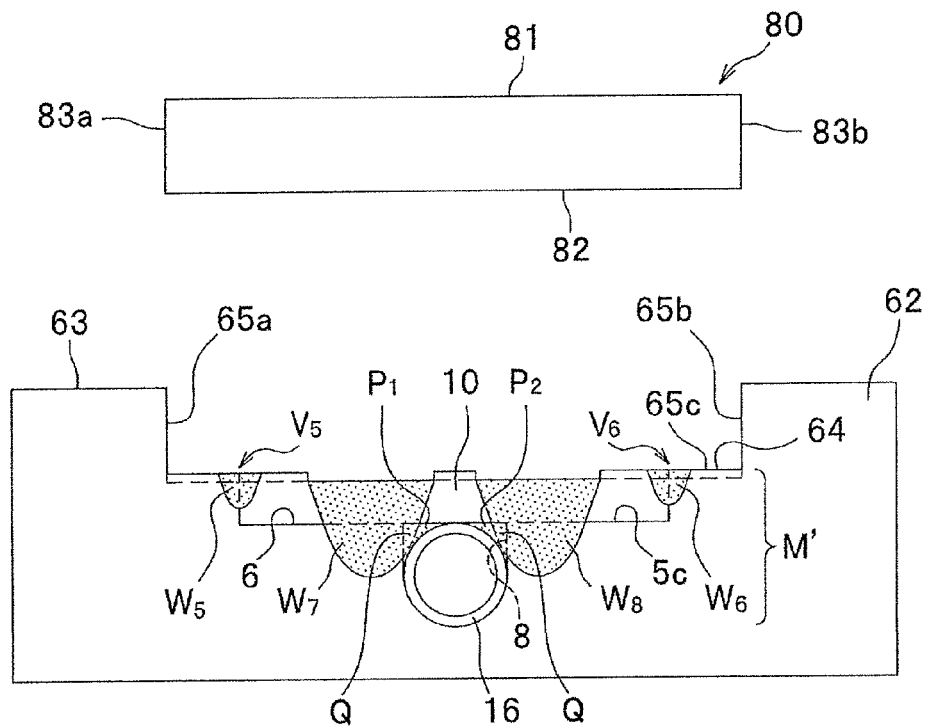
FIGS. 17A and 17B are drawings showing a heat transfer plate relating to a fifth embodiment of the invention.
Figure 17B:
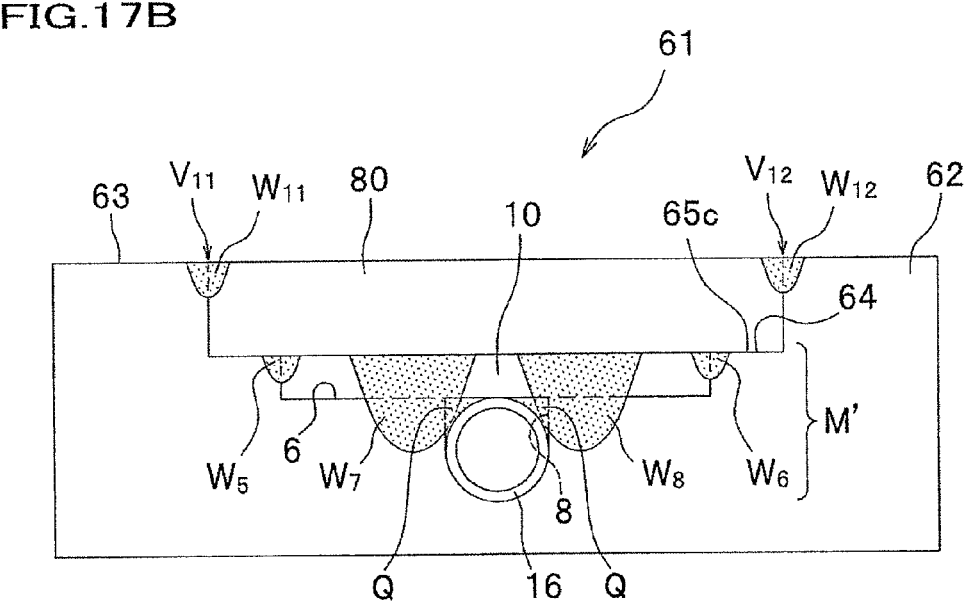

Next will be described a heat transfer plate relating to a fifth embodiment of the invention. FIG. 17A is an exploded side view showing the heat transfer plate relating to the fifth embodiment; and FIG. 17B is a side view showing the heat transfer plate relating to the fifth embodiment.

A heat transfer plate 61 relating to the fifth embodiment is different from that of the third embodiment in a point that the plate 61 includes a structure approximately equivalent to the heat transfer plate 1A (see FIG. 11), further arranges an upper lid plate 80 on an obverse of the lid plate 10, and friction stirring joining is applied and joined.

In addition, a structure equivalent to the heat transfer plate 1A (see FIG. 11) relating to the third embodiment is hereinafter also referred to as a lower lid portion M'. Furthermore, with respect to a member repeating that of the heat transfer plate 1A relating to the third embodiment, an equivalent symbol will be added and a duplicate description will be omitted.

The heat transfer plate 61 comprises a base member 62, the heat medium pipe 16 inserted in the concave groove 8, the lid plate 10, and the upper lid plate 80 arranged in an obverse of the lid plate 10, and is integrated at plasticized regions $W_{11}$, $W_{12}$ by friction stirring joining.

The base member 62 consists, for example, of an aluminum alloy, and as shown in FIGS. 17A and 17B, comprises an upper lid groove 64 formed in an obverse 63 of the base member 62 over a longitudinal direction thereof; and the concave groove 8 formed in the bottom face 5c of the lid groove 6 over a longitudinal direction thereof. The upper lid groove 64 presents a rectangle in section view, and comprises sidewalls 65a, 65b vertically rising from a bottom face 65c of the groove 64. A width of the upper lid groove 64 is formed wider than that of the lid groove 6. The bottom face 65c of the upper lid groove 64 is machined by facing after generations of the plasticized regions $W_7$, $W_8$ and is a same level with surfaces of the regions $W_7$, $W_8$.

The heat medium pipe 16 is inserted in the concave groove 8 formed at a lower portion of the base member 62, the groove 8 is closed by the lid plate 10, the member 62 is joined at the plasticized regions $W_5$, $W_6$ by friction stirring joining, the plasticized regions $W_7$, $W_8$ are further formed from an obverse of the lid plate 10 to below the bottom face 5c of the lid groove 6, and the plastic fluidizing material Q is made to flow in the air gap portions $P_1$, $P_2$ (see FIG. 10) around the pipe 16. That is, the lower lid plate M' formed inside the base member 62 is formed approximately equivalent to the heat transfer plate 1A relating to the third embodiment except for a facing portion.

As shown in FIGS. 17A and 17B, the upper lid plate 80 consists, for example, of an aluminum alloy; forms a rectangular section approximately equal to a section of the upper lid groove 64; and has an upper face 81, a lower face 82, and side faces 83a, 83b vertically formed from the lower face 82. The upper lid plate 80 is inserted in the upper lid groove 64. That is, the side faces 83a, 83b of the upper lid plate 80 are contacted with sidewalls 65a, 65b of the upper lid groove 64 or are arranged with keeping a minute gap. Here, it is assumed that a butt face between the side face 83a and the sidewall 65a is hereinafter referred to as an upper butt portion $V_{11}$; and a butt face between the side face 83b and the sidewall 65b is hereinafter referred to as an upper butt portion $V_{12}$. The upper butt portions $V_{11}$, $V_{12}$ are integrated at the plasticized regions $W_{11}$, $W_{12}$ by the friction stirring joining.

The method of manufacturing the heat transfer plate 61 includes, after forming the lower plate portion M' at a lower portion of the base member 62 according to a manufacturing method equivalent to that of the heat transfer plate 1A relating to the third embodiment, an upper lid groove closing process of arranging the upper plate 80, and an upper lid joining process of applying the friction stirring joining along the upper butt portions $V_{11}$, $V_{12}$.

After the lower plate portion M' is formed, in the upper lid groove closing process, the upper lid plate 80 is arranged in the upper lid groove 64. At this time, because the bottom face 65c of the upper lid groove 64, and upper faces of the lid plate 10 and the plasticized regions $W_5$ to $W_8$ are not flat (uneven) due to the joining process, face machining of cutting the bottom face 65c and the upper faces is applied (see an upper broken line portion of FIG. 17A).

In the upper lid groove closing process, a joining rotation tool (not shown) is moved along the butt portion $V_{11}$, $V_{12}$ and the friction stirring joining is applied. An embedded depth of the joining rotation tool in the upper lid groove closing process may be appropriately set according to various conditions such as a pin length, a thickness of the upper lid plate 80, and the like.

According to the heat transfer plate 61 relating to the fifth embodiment, it is possible to arrange the heat medium pipe 16 at a deeper position by further arranging the upper lid plate 80 on the lower lid portion M' and applying the friction stirring joining.

Thus although the third to fifth embodiments have been described, the invention is not limited thereto; it is possible to appropriately change them without deviating from the spirit and scope of the invention. For example, in the embodiments, although the lid plates and the upper lid plates are arranged on the upper face sides of the base members, they may also be arranged on the lower face sides thereof.

Furthermore, in the embodiments, although it is assumed that the inflow stirring rotation tool 250 used in the inflow stirring process is larger than the joining rotation tool 200 used in the joining process, the tool 250 may be used in the joining process. Thus it is possible to unify a rotation tool used in each process, to omit a change time of the rotation tool, and to shorten an application time. Furthermore, it is also available to use the inflow stirring rotation tool 250 and to apply friction stirring joining to the butt portions $V_5$, $V_6$ and the upper butt portions $V_{11}$, $V_{12}$ over a whole depth direction thereof.

[Sixth Embodiment]

As shown in FIGS. 18A-20, a heat transfer plate 1C relating to a sixth embodiment of the invention is configured to house the heat medium pipe 16 inside the plate form base member 2, wherein a heat medium is circulated for heating or cooling a heat component in the pipe 16. Then the base member 2 comprises the concave groove 8 open to the obverse 3 thereof and having a depth size longer than an outer diameter size of the heat medium pipe 16. The heat medium pipe 16 is inserted in the concave groove 8, is plastically deformed by pushing the lid plate 10 inserted in an opening 12a of an upper portion of the groove 8 to a bottom 12b of the groove 8, and abuts with the bottom 12b. In addition, in the sixth embodiment the heat medium pipe 16 presents a circle in section before the plastic deformation.

Figure 18C:
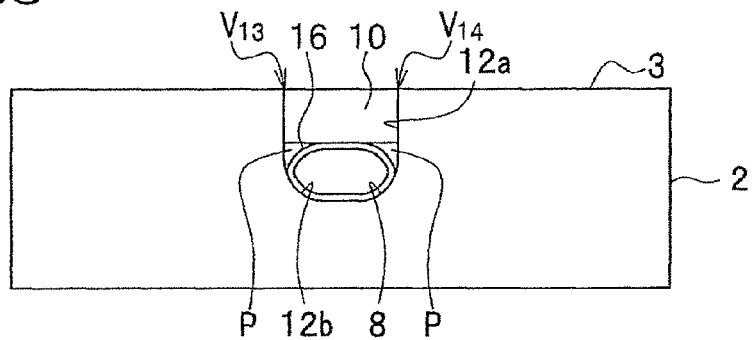
Figure 19A:
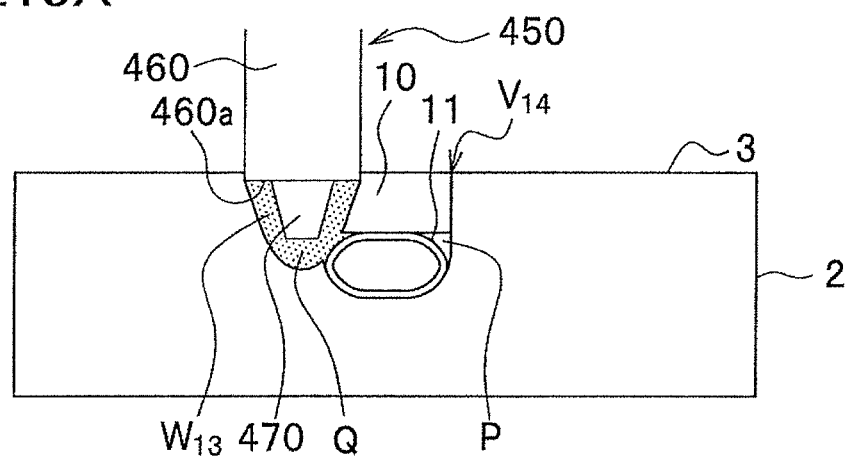
FIGS. 19A and 19B are drawings showing a method of manufacturing a heat transfer plate relating to the sixth embodiment.
Figure 19B:
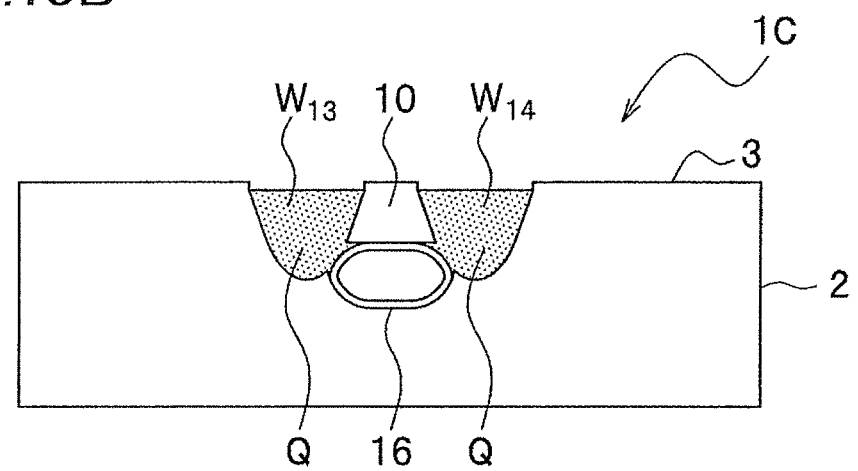
Figure 20:
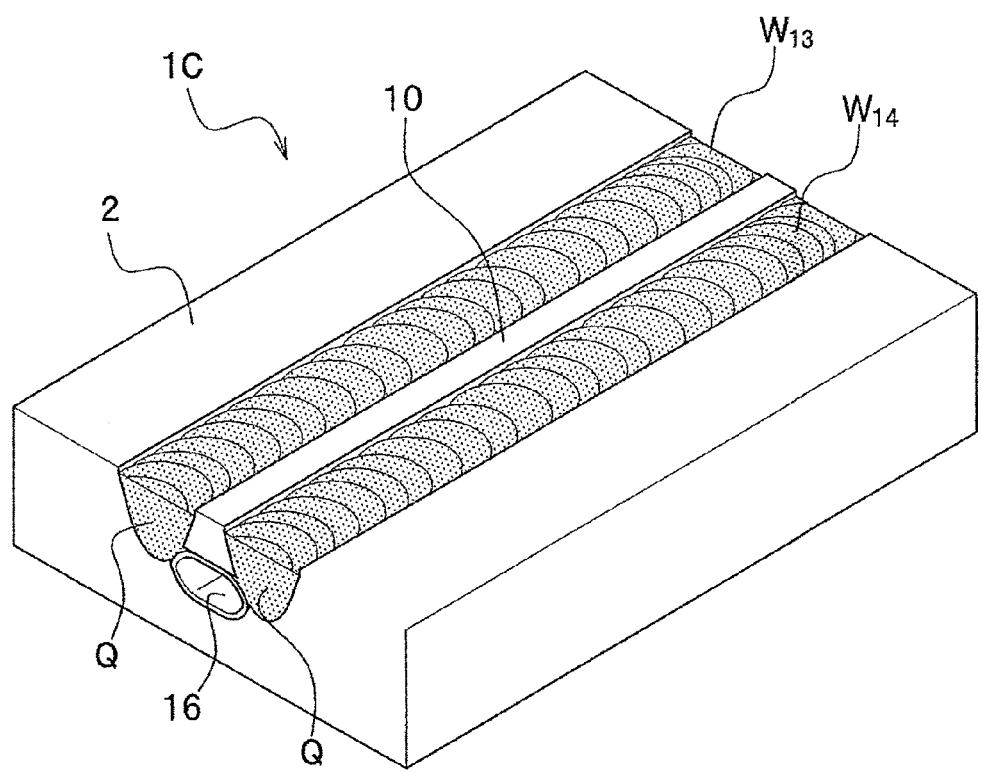
FIG. 20 is a perspective view showing the heat transfer plate relating to the sixth embodiment.

The base member 2 and the lid plate 10 are, as shown in FIGS. 19B and 20, are integrated by plasticized regions $W_{13}$, $W_{14}$ formed by means of friction stirring joining. Moreover, the plastic fluidizing material Q formed by the friction stirring joining are flowed in the air gap portions P, P (see FIG. 18C) formed by the concave groove 8, an outer face of the heat medium pipe 16, and a lower face of the lid plate 10. Here, it is assumed that a "plasticized region" includes both states: a state of being heated due to frictional heat of a rotation tool and actually plasticized; and a state of the rotation tool having passed through and the region being returned to a room temperature.

Figure 18A:
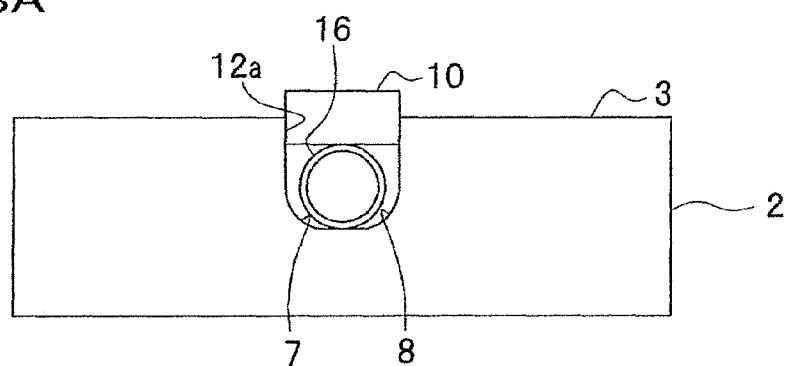
FIGS. 18A-18C are drawings showing a method of manufacturing a heat transfer plate relating to a sixth embodiment of the invention.
Figure 18B:
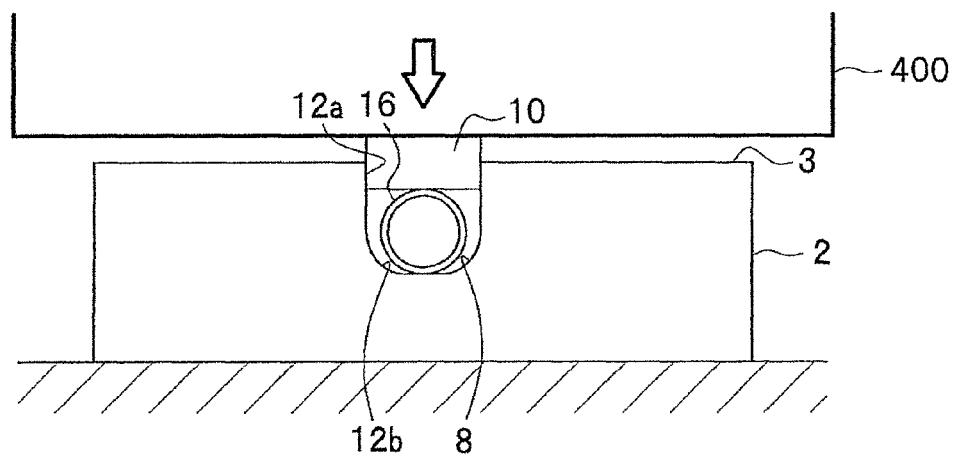

The base member 2 plays a role of transferring heat of a heat medium, which flows through the heat medium pipe 16, outside, and is configured with an extrusion section bar consisting of any one of aluminum and an aluminum alloy (for example, JIS: A6061). As shown in FIGS. 18A-18C, the concave groove 8 is formed open to the obverse 3 of one side of the base member 2.

The concave groove 8 is a portion, where the heat medium pipe 16 and the lid plate 10 are housed, and is continuously formed over a longitudinal direction of the base member 2. The concave groove 8 has an inner surface (inner wall face) orthogonal to the obverse 3 of the base member 2. The bottom portion 12b of the concave groove 8 is formed like a curved surface, wherein bottom-portion inlet corners of width-directional both-ends of the bottom portion 12b are machined to the curved surface; the concave groove 8 is formed to present like a U letter in section. The concave groove 8 comprises a width size longer than an outer diameter size in a longitudinal direction of the heat medium pipe 16 before a plastic deformation. Furthermore, a depth size of the concave groove 8 is longer than an outer diameter size in a height direction of the heat medium pipe 16, and shorter than a size where the outer diameter size in the height direction of the pipe 16 and a thickness size of the lid plate 10 are added.

The heat medium pipe 16 is configured with a cylindrical member presenting a circle in section before the plastic deformation, and contacts the bottom portion 12b of the concave groove 8 in a face-to-face relationship by being pressed and plastically deformed. The heat medium pipe 16 is a member for circulating a heat medium such as cooling water, a cooling gas, a high temperature liquid, and a high temperature gas inside the pipe 16, and is configured, for example, with a copper pipe and the like whose heat conductivity is high.

As shown in FIG. 18A-18C, the lid plate 10 is configured, for example, with an extrusion section bar consisting of any one of aluminum and an aluminum alloy (JIS: A6061), and presents a rectangle in section. The lid plate 10 has a width size approximately equivalent to that of the concave groove 8.

The air gap portion P is, as shown in FIG. 18C, a space surrounded by an upper face of the heat medium pipe 16, inner side faces of the concave groove 8, and a lower face of the lid plate 10 after the plastic deformation, and in the sixth embodiment, because an upper end of the pipe 16 and the lower face of the plate 10 are contacted, two air gap portions P, P are formed in a left-to-right direction in the FIG. 18C with separating this contact portion. Each air gap portion P presents an approximate triangle in section whose outside is extended. In addition, the air gap portion P is appropriately decided on the basis of forms of the heat medium pipe 16 and the lid plate 10, and is not limited to the embodiments.

The plasticized regions $W_{13}$, $W_{14}$ are, as shown in FIGS. 19A, 19B, and 20, regions where parts of the base member 2 and the lid plate 10 are plastically fluidized and integrated in applying friction stirring joining to butt portions $V_{13}$, $V_{14}$ (see FIG. 18C). In addition, the plasticized regions $W_{13}$, $W_{14}$ are shown by hatching in FIGS. 19A, 19B, and 20.

When a rotation tool 450 (see FIG. 19A) described later is used and friction stirring joining is applied along the butt portions $V_{13}$, $V_{14}$, metal materials of third embodiment base member 2 and the lid plate 10 around the portions $V_{13}$, $V_{14}$ are fluidized due to frictional heat of the tool 450. At this time, the fluidized metal materials (plastic fluidizing material Q) flow in the air gap portions P, P and embed gaps, harden, and integrally join the base member 2 and the lid plate 10.

It is possible in performing the friction stirring joining to favorably make the plastic fluidizing material Q flow in the air gap portion P by setting a pushed-in amount, insertion position and the like of the rotation tool 450, based on a form, size, and the like of the air gap portion P. Namely, it is preferable to make the rotation tool 450 approach so as not to contact the heat medium pipe 16 and to make the plastic fluidizing material Q flow in the air gap portion P without a gap.

Next will be described a method of manufacturing the heat transfer plate 1C. When the heat transfer plate 1C is manufactured according to the manufacturing method relating to the sixth embodiment, as shown in FIG. 18C, firstly, the heat medium pipe 16 is inserted in the concave groove 8 formed open to the obverse 3 of the base member 2 (pipe insertion process). At this time, the heat medium pipe 16 inserted to be positioned at a width-directional middle portion of the concave groove 8. The lid plate 10 is inserted in the opening 12a of the concave groove 8, and on the heat medium pipe 16 inside the groove 8 (concave groove closing process).

According to the sixth embodiment, as the heat medium pipe 16, a copper pipe is used whose outer diameter is 12.7 mm and thickness is 1 mm. Then the concave groove 8 is formed to be 17 mm in width and to be 16.7 mm in depth; the lid plate 10 is formed to be 17 mm in width and to be 8 mm in thickness.

In addition, although the base member 2 is configured with an extrusion section bar, and the concave groove 8 is formed when the member 2 is extruded, it is also available to form a concave groove comprising a semicircle section by known cutting and the like in an obverse of a flat plate of an aluminum alloy.

When the lid plate 10 is inserted onto the heat medium pipe 16, the plate 10 is in a state of being protruded by 4 mm more than the obverse 3 of the base member 2.

After that, as shown in FIG. 18B, the lid plate 10 is set in a press machine 400 and is pressed to the bottom portion 12b of the base member 2. According to the sixth embodiment, the lid plate 10 is pressed as far as a protruded top end thereof is a same height with the obverse 3 of the base member 2 (pressing process).

Thus the lid plate 10 is pushed inside the concave groove 8, and the heat medium pipe 16 is sandwiched and pressed between the bottom portion 12b of the concave groove 8 and the plate 10, and is plastically deformed. At this time, because the heat medium pipe 16, the concave groove 8, and the lid plate 10 are set to the sizes and the forms described above, the pipe 16 is plastically deformed like a compressed form as shown in FIG. 18C. Furthermore, the side faces of the lid plate 10 and the inner side faces of the concave groove 8 are contacted in a face-to-face relationship, and the upper face of the plate 10 is a same level with the obverse 3 of the base member 2. Here, the butt portions $V_{13}$, $V_{14}$ are formed by the inner side faces of the concave groove 8 and the side faces of the lid plate 10.

At this time, because the heat medium pipe 16 is pressed in a closed space by the lid plate 10 in a state of being completely housed inside the concave groove 8, the pipe 16 is deformed along the inner surface of the groove 8 and not deformed outside the groove 8; therefore, it is possible to surely deform the pipe 16 to a desired form. Accordingly, the heat medium pipe 16 and the base member 2 are closely contacted, and a contact area thereof is large; therefore, it is possible to increase the heat conductivity of the heat transfer plate 1C. Furthermore, even when the concave groove 8 is plurally provided, the lid plate 10 is inserted one by one in one concave groove 8; therefore, it is possible to reduce a contact area between the press machine 400 and the plate 10. Accordingly, it is possible to intensively transmit a pressing force to the press machine 400 and to deform the heat medium pipe 16 by a small pressing force. That is, by directly utilizing the pressing force of the press machine 400 for the lid plate 10 to the deformation of the heat medium pipe 16, it is possible to reduce the pressing force thereof, and it is easy to produce the heat transfer plate 1C.

Furthermore, because the inlet corners of the width-directional both ends of the bottom portion 12b of the concave groove 8 are formed like a curved surface, a deformed portion of the heat medium pipe 16 easily follows the inner surface of the concave groove 8, and the pipe 16 deforms along a form of the bottom portion 12b of the groove 8. Thus the heat medium pipe 16 contacts the inner surface of the bottom portion 12b of the concave groove 8 in a face-to-face relationship, a contact property between the pipe 16 and the base member 2 is increased, and it is possible to improve the heat conductivity of the heat transfer plate 1C.

Moreover, the concave groove 8, the heat medium pipe 16, and the lid plate 10 are formed to be the predetermined sizes, and thereby the plate 10 is protruded more than the obverse 3 of the base member 2 when it is inserted in the opening 12a of the groove 8. Then by pressing the protruded top end of the lid plate 10 as far as the obverse 3 of the base member 2, the heat medium pipe 16 is plastically deformed; thereby, because a pushed-in length of the plate 10 is kept constant, it is possible to easily control a deformation amount and deformation form of the pipe 16.

Next, as shown in FIG. 19A, friction stirring joining is sequentially applied along the butt portions $V_{13}$, $V_{14}$ ($V_{13}$ in FIG. 19A) (friction stirring joining process). At this time, because the butt portions $V_{13}$, $V_{14}$ can be seen on the obverse 3 of the base member 2 by visual check, it is possible to surely perform the friction stirring joining at a precise position.

The friction stirring joining is performed by the known rotation tool 450. The rotation tool 450 consists, for example, of tool steel, and comprises a columnar tool body 460, and a pin 470 vertically hanging down through a concentric axis from a center portion of a bottom face 460a of the body 460. The pin 470 is formed like a taper narrower toward a top end thereof. In addition, on a peripheral face of the pin 470 may be formed a plurality of small grooves, not shown, along an axial direction of the axis, and a screw thread along a radial direction of the axis.

In the friction stirring joining the rotation tool 450 rotating at a high speed is pushed in each of the butt portions $V_{13}$, $V_{14}$ in a state of the base member 2 and the lid plate 10 being constrained by a jig not shown, and the tool 450 is moved along the butt portions $V_{13}$, $V_{14}$. By the pin 470 rotating at the high speed, aluminum alloy materials around the pin 470 are heated due to frictional heat and fluidized. Then the fluidized materials (plastic fluidizing material Q) flow in the air gap portion P.

A pushed-in amount (pushed-in length) of the rotation tool 450 is adapted to be a length such that a metal volume of the lid plate 10 pushed aside by the tool body 460 is equivalent to a sum of a volume of a plastically fluidized aluminum alloy material filled in one air gap portion P around the heat medium pipe 16 and a volume of a burr generated on width-directional both sides of plasticized region $W_{15}$ ($W_{16}$).

According to the processes thus described, as shown in FIG. 20, the plasticized regions $W_{13}$, $W_{14}$ are formed along the butt portions $V_{13}$, $V_{14}$ (see FIG. 18C), and the heat medium pipe 16 is hermetically closed by the base member 2 and the lid plate 10. Moreover, because the plastic fluidizing material Q is made to flow in the air gap portion P (see FIG. 19A) and is filled therein, each member is closely contacted and it is possible to form the heat transfer plate 1C whose heat conductivity is high. Furthermore, because the base member 2 and the lid plate 10 are joined by the friction stirring joining, it is possible to increase a joining strength of the heat transfer plate 1C.

Furthermore, because it is possible to easily control the deformation amount and deformation form of the heat medium pipe 16 as described above, it is possible to plastically deform the pipe 16 to a desired form. Accordingly, a contact property between the base member 2 and the lid plate 10 can be further increased, and the heat conductivity can be further increased.

Furthermore, according to the heat transfer plate 1C thus described, because the heat medium pipe 16 is plastically deformed like a compressed form, a surface area of the pipe 16 can be enlarged, and heat conductivity thereof can be further increased.

Moreover, according to the sixth embodiment, because the heat medium pipe 16 of a circle in section is deformed after being inserted in the concave groove 8, it is possible to easily perform machining the pipe 16. That is, when a plurality of concave grooves are formed in one heat transfer plate, a heat medium pipe is formed like an S letter in plan view so as to connect each concave groove; however, it is difficult to deform a heat medium pipe formed like a compressed form. But according to the method of manufacturing the heat transfer plate 1C, because the heat medium pipe 16 of a circle in section is plastically deformed in the concave groove 8, it is possible to easily form the heat medium pipe of a compressed form like an S letter in plan view.

Furthermore, because the base member 2 and the lid plate 10 are plastically fluidized in the plasticized regions $W_{13}$, $W_{14}$ by the friction stirring joining of both metal materials, and the plastic fluidizing material Q is flowed in the air gap portion P, it is possible to join the base member 2 and the lid plate 10 and to embed the air gap portion P. Furthermore, in the friction stirring joining, because the heat medium pipe 16 is pressurized by the bottom face 460a (shoulder) of the tool body 460 of the rotation tool 450, it is possible to increase a contact property between the member 2 and the concave groove 8. Thus it is possible to efficiently transfer a heat energy from a heat medium circulating in the heat medium pipe 16 to the base member 2.

In addition, the sizes of the concave groove 8, the lid plate 10, the heat medium pipe 16, and the like described above are absolutely an exemplification, and do not limit the invention. The sizes may be appropriately set according to a size of each member.

[Seventh Embodiment]

Next will be described a seventh embodiment of the invention with reference to drawings as needed.

As shown in FIGS. 21A-21C and 22A-22C, according to a method of manufacturing the heat transfer plate 1C relating to the seventh embodiment, the lid plate 10 is configured with an iron jig 333 instead of an extrusion section bar of an aluminum alloy.

The iron jig 331 is used as a lid plate in pressing the heat medium pipe 16, and an arc-like concave portion 331a is formed on a lower face thereof. The concave portion 331a is formed by a predetermined curvature radius and is configured so that an upper end of the heat medium pipe 16 is plastically deformed like a curved surface. Furthermore, the iron jig 331 has a width size slightly smaller than that of the concave groove 8. Moreover, the iron jig 331 has a size so as to protrude more than the obverse 3 of the base member 2 when the jig 331 is inserted in the concave groove 8 at an upper portion of the heat medium pipe 16 similarly to the lid plate 10 consisting of the extrusion section bar of the sixth embodiment.

Figure 21A:
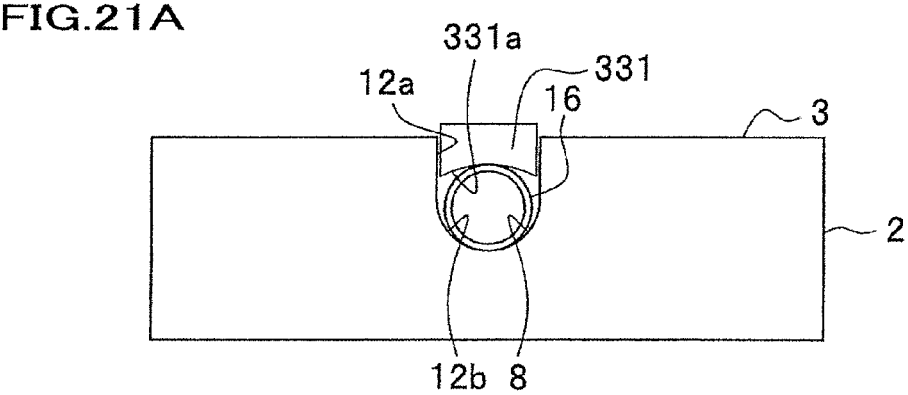
FIGS. 21A-21C are drawings showing a method of manufacturing a heat transfer plate relating to a seventh embodiment.

In manufacturing the heat transfer plate 1C by the manufacturing method relating to the seventh embodiment, as shown in FIG. 21A, firstly, the heat medium pipe 16 is inserted in the concave groove 8 formed open to the obverse 3 of the base member 2 and formed therein (pipe insertion process); and the iron jig 331 is inserted in the opening 12a of the groove 8 at the upper portion of the pipe 16 in the groove 8 (concave groove closing process).

At this time, the iron jig 331 is protruded more than the obverse 3 of the base member 2. In addition, because the iron jig 331 is formed of a width size smaller than that of the concave groove 8, it is sufficient to only place the jig 331 on the upper portion of the heat medium pipe 16.

Figure 21B:
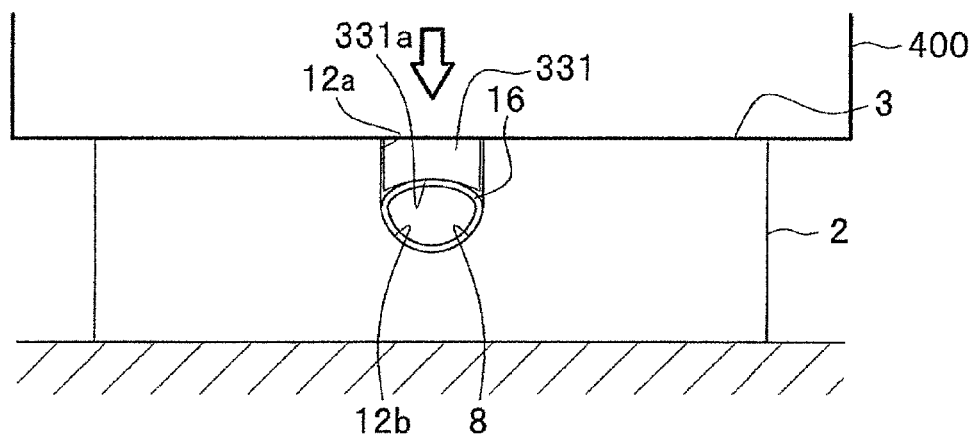

After that, as shown in FIG. 21B, the iron jig 331 is set in the press machine 400 and is pressed to the bottom portion 12b of the concave groove 8 (pressing process). According to the seventh embodiment, to the iron jig 331 is applied a load of 4 tons, and the jig 331 is pressed as far as the protruded top end thereof is a same level with the obverse 3 of the base member 2. Thus the iron jig 331 is pushed inside the concave groove 8, and the heat medium pipe 16 is sandwiched and pressed between the jig 331 and the bottom portion 12b of the groove 8 and is plastically deformed like a compressed form. At this time, because the concave portion 331a is formed on the lower face of the iron jig 331, the heat medium pipe 16 is deformed along the portion 331a, and the plastic deformation is smoothly performed. In addition, it goes without saying that the concave portion 331a is not limited to a constant curvature radius, and another form such as an ellipse may also be available whose curvature radius gradually changes.

Figure 21C:
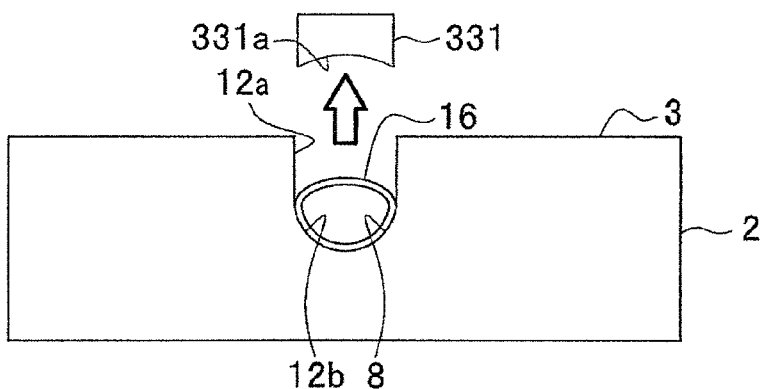
Figure 22A:
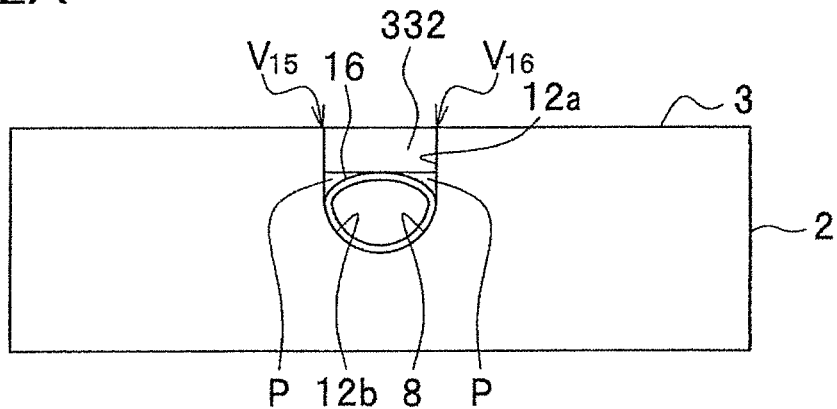
FIGS. 22A-22C are drawings showing the method of manufacturing the heat transfer plate relating to the seventh embodiment.

When pressing the iron jig 331 by the press machine 400 is completed, as shown in FIG. 21C, the jig 331 is taken out from the concave groove 8, and as shown in FIG. 22A, another lid plate 332 is inserted in the groove 8 (lid plate insertion process). The lid plate 332 presents a rectangle in section, has a thickness size equivalent to that between an upper face of the iron jig 331 and a middle portion of the concave portion 331a of the jig 331 (size of thinnest portion), and is fitted in the groove 8. Then with respect to the lid plate 332 fitted in the concave groove 8, an upper face thereof is a same level with the obverse 3 of the base member 2, and side faces of the plate 332 and the inner side faces of the groove 8 are contacted in a face-to-face relationship. Here, butt portions $V_{15}$, $V_{16}$ are formed by the inner side faces of the concave groove 8 and the side faces of the lid plate 332.

Figure 22B:
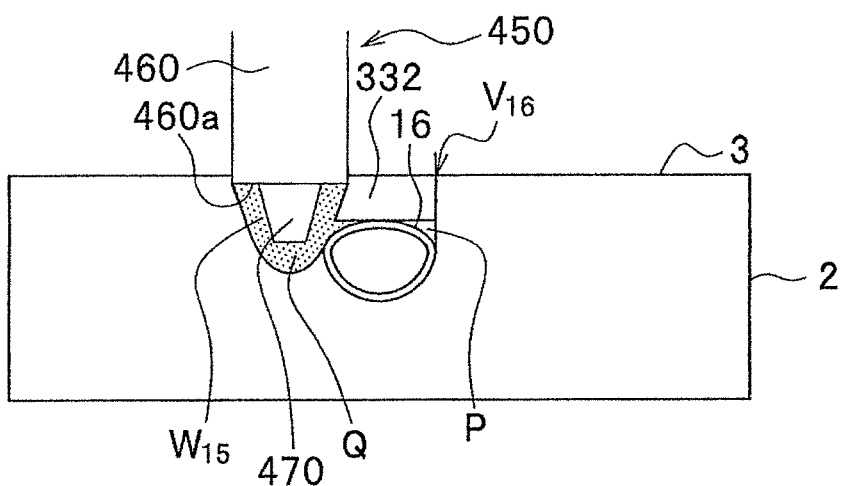

As shown in FIG. 22B, friction stirring joining is sequentially applied along the butt portions $V_{15}$, $V_{16}$ ($V_{15}$ in FIG. 22B) (friction stirring joining process). Thus aluminum alloy materials of the base member 2 and the lid plate 332 around the butt portions $V_{15}$, $V_{16}$ are heated and fluidized due to frictional heat, and this fluidized metal material (plastic fluidizing material Q) flows in the air gap portion P. At this time, because the lid plate 332 is a rectangle in section and a lower face thereof is flat, the air gap portion P formed between the plate 332 and the heat medium pipe 16 is connected to the inner side faces of the concave groove 8. That is, by pressing the heat medium pipe 16 with the iron jig 331 having the concave portion 331a, the upper face of the plate 16 is formed like an arc, and the plate-form lid plate 332 is placed thereon; thereby, the air gap portion P is surely connected to the inner side faces of the concave groove 8. Accordingly, the plastic fluidizing material Q surely flows in the air gap portion P, a contact property between each member is increased, and it is possible to increase the heat conductivity of the heat transfer plate 1C.

Figure 22C:
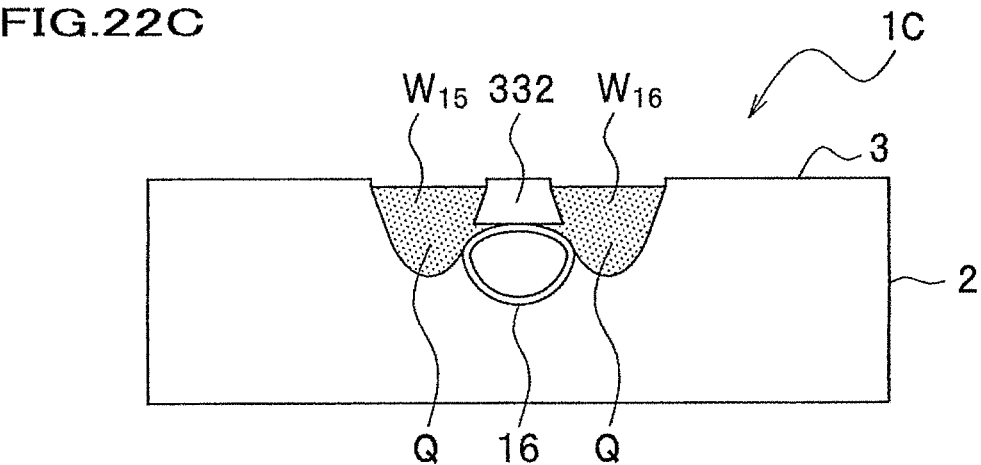

According to the processes thus described, the heat transfer plate 1C whose configuration is approximately similar to that of the sixth embodiment is manufactured (see FIG. 22C). According to the seventh embodiment, the following operation and effect are obtained, other than those obtained by the sixth embodiment. In short, according to the seventh embodiment, because the heat medium pipe 16 is pressed by using the iron jig 331 where the concave portion 331a like a curved surface is formed on the bottom face thereof, the upper face of the pipe 16 is smoothly deformed along the portion 331a, and it is easy to control a deformation form. Furthermore, because the middle portion of the upper face of the heat medium pipe 16 is not depressed inside, it is possible to make the plastic fluidizing material Q surely flow in between the pipe 16 and the lid plate 332 and to increase the contact property between each member.

Thus although the seventh embodiment of the invention has been described, the invention is not limited thereto; it is possible to change it in design without deviating from the spirit and scope of the invention. For example, in the sixth embodiment, although one concave groove 8 is provided in the heat transfer plate 1C, it goes without saying that the groove 8 may be plurally provided.

EXAMPLE 1

Here will be described examples 1 and 2 of the heat transfer plate 1 relating to the first embodiment. A size of each element configuring the heat transfer plate 1 will be referred to FIGS. 2 and 4A-4E as needed. With respect to the examples 1 and 2, as shown in Table 1, in addition to setting two kinds of preconditions regarding the outer diameter B of the heat medium pipe (also called a copper pipe) 16, the thickness D of the copper pipe, the groove width E of the lid groove 6, and the lid thickness F of the lid plate 10, tests were performed with using the pin length G, pushed-in amount H, and offset amount I of the main joining rotation tool 20 as parameters, and a joining state of each condition is evaluated by visual check. The rotation number of the pin was 700 rpm and the joining speed (sending speed) was 300 mm/min in friction stirring joining.

With respect to the example 1, as shown in Table 1, in addition to a precondition of the outer diameter B of the copper pipe, 12.7 mm; the thickness D thereof, 1.0 mm; the groove width E of the lid groove, 13.0 mm; and the lid thickness F of the lid plate 10, 6.0 mm, as shown in Table 2, tests were performed with using the pin length G, the pushed-in amount H, and the offset amount I as parameters. Conditions of the tests were classified into conditions 1 to 5 according to the pin length G and the pushed-in amount H, and further into conditions a to d according to the offset amount I.

TABLE 1

|  | Diameter B (mm) | Thickness D (mm) | Groove Width E (mm) | Lid Thickness F (mm) |
|---|---|---|---|---|
| Precondition of Example 1 | 12.7 | 1.0 | 13.0 | 6.0 |
| Precondition of Example 2 | 10.0 | 1.0 | 10.3 | 6.0 |

TABLE 2

|  |  | Pin Length G (mm) | Pushed-in Amount H (mm) | Offset Amount I (mm) | Joining State |
|---|---|---|---|---|---|
| Condition 1 | 1a | 6.0 | 1.0 | 1.0 | — |
|  | 1b |  |  | 2.0 | ⊗ |
|  | 1c |  |  | 3.0 | x |
|  | 1d |  |  | 4.0 | x |
| Condition 2 | 2a | 8.0 | 0.7 | 1.0 | x |
|  | 2b |  |  | 2.0 | x |
|  | 2c |  |  | 3.0 | x |
|  | 2d |  |  | 4.0 | x |
| Condition 3 | 3a | 8.0 | 1.0 | 1.0 | ⊕ |
|  | 3b |  |  | 2.0 | ⊕ |
|  | 3c |  |  | 3.0 | ⊕ |
|  | 3d |  |  | 4.0 | ⊗ |

TABLE 2-continued

|  |  | Pin Length G (mm) | Pushed-in Amount H (mm) | Offset Amount I (mm) | Joining State |
|---|---|---|---|---|---|
| Condition 4 | 4a | 8.0 | 1.3 | 1.0 | Δ |
|  | 4b |  |  | 2.0 | Δ |
|  | 4c |  |  | 3.0 | ⊕ |
|  | 4d |  |  | 4.0 | ⊕ |
| Condition 5 | 5a | 10.0 | 1.0 | 1.0 | Δ |
|  | 5b |  |  | 2.0 | Δ |
|  | 5c |  |  | 3.0 | ⊕ |
|  | 5d |  |  | 4.0 | ⊕ |

With respect to the item "Joining State" shown in Table 2, a gap (air gap portion P) around the heat medium pipe 16 and a crushed state thereof were observed by visual check, and a state of the gap being extremely small and there being no pipe crush was evaluated as "⊕"; a state of there being a slight gap and no pipe crush as "ⓧ"; a state of there being no gap and a pipe crush as "Δ"; and a state of there being a large gap as "x".

As apparent from Table 2, with respect to the conditions 3a to 3c, the condition 4c, the condition 4d, and the conditions 5c and 5d, it was confirmed that the plastic fluidizing material Q favorably flows in the air gap portion P, and that the heat transfer plate 1 whose heat exchange efficiency is high is formed.

On one hand, with respect to the conditions 1 and 2, it was confirmed that the joining states are poor. That is, because a distance from the heat medium pipe 16 to the top end of the pin 26 is far, the plastic fluidizing material Q does not flow in the air gap portion P, or because the flow-in amount of the plastic fluidizing material Q is little, there occurs a large gap.

On one hand, with respect to the conditions 4a, 4b, 5a, and 5b, it was confirmed that a distance from the heat medium pipe 16 to the top end of the pin 26 is too near, and that the pipe crush has occurred.

EXAMPLE 2

With respect to the example 2, as shown in Table 1, in addition to a precondition of the outer diameter B of the copper pipe, 10.0 mm; the thickness D thereof, 1.0 mm; the groove width E of the lid groove 6, 10.3 mm; and the lid thickness F of the lid plate 10, 6.0 mm, as shown in Table 3, tests were performed with using the pin length G, the pushed-in amount H, and the offset amount I as parameters. Conditions of the tests were classified into conditions 6 and 7 according to the pin length G and the pushed-in amount H, and further into conditions a to h according to the offset amount I.

TABLE 3

|  |  | Pin Length G (mm) | Pushed-in Amount H (mm) | Offset Amount I (mm) | Joining State |
|---|---|---|---|---|---|
| Condition 6 | 6a | 6.0 | 1.0 | 0.0 | Δ |
|  | 6b |  |  | 1.0 | ⊕ |
|  | 6c |  |  | 2.0 | ⊗ |
|  | 6d |  |  | 3.0 | x |
| Condition 7 | 7a | 8.0 | 1.0 | 0.0 | Δ |
|  | 7b |  |  | 0.5 | ⊕ |
|  | 7c |  |  | 1.0 | ⊕ |
|  | 7d |  |  | 1.5 | ⊕ |
|  | 7e |  |  | 2.0 | ⊕ |
|  | 7f |  |  | 2.5 | ⊕ |
|  | 7g |  |  | 3.0 | ⊗ |
|  | 7h |  |  | 3.5 | ⊗ |

As apparent from Table 3, with respect to the conditions 6b and the conditions 7b to 7f, it was confirmed that the joining states are good. Furthermore, it was confirmed that: when the conditions 6 and 7 are compared, in the conditions 6 the offset amount I is 1.0 mm and the joining state thereof is good; whereas in the condition 7 the joining state is good in a wide range of the offset amount I, 0.5 to 2.5 mm. That is, under the conditions of the example 2, it was confirmed that a case of the pin length G and the pushed-in amount H in the condition 7 is adaptable in a wide range of the offset amount I.

Figure 23:
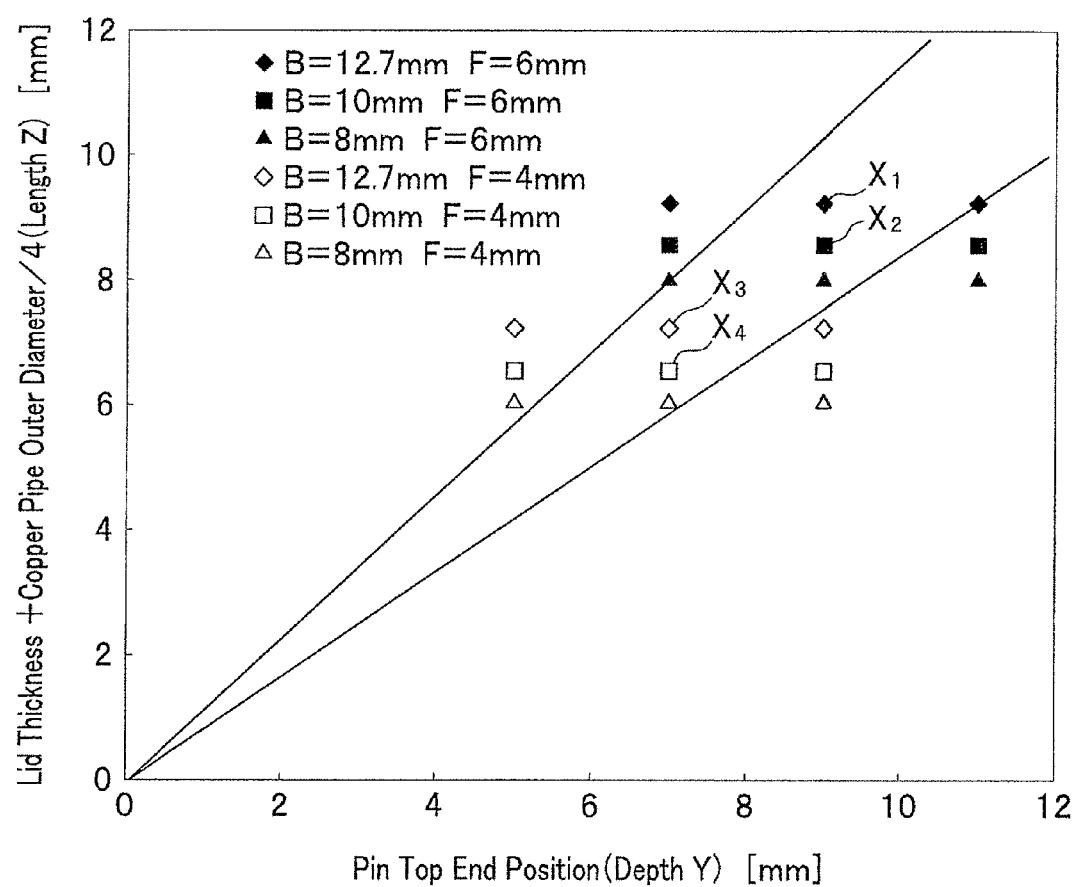
FIG. 23 is a graph showing a correlation between a pin top end position of a main joining rotation tool, a lid thickness, and a diameter of a copper pipe.
Figure 24A:
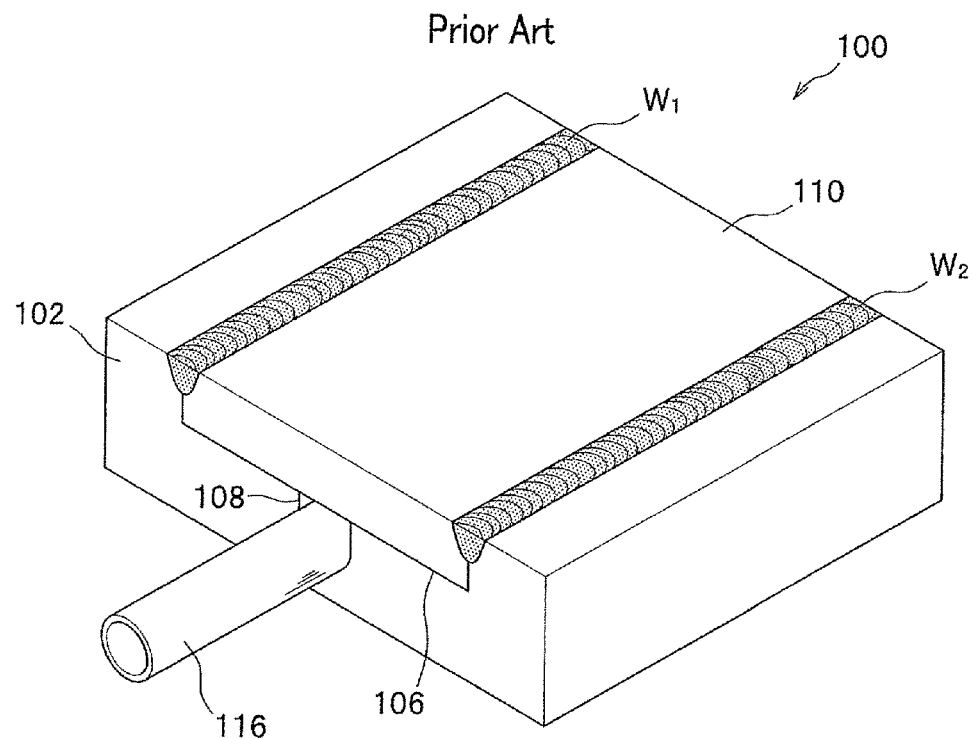
FIGS. 24A and 24B are drawings showing a conventional heat transfer plate.
Figure 24B:
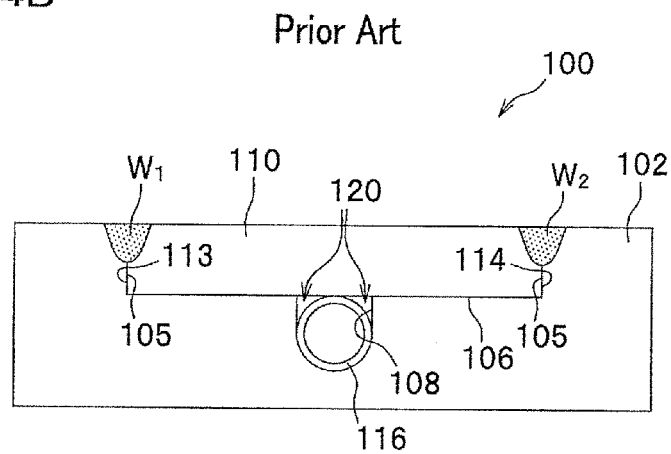
Figure 25:
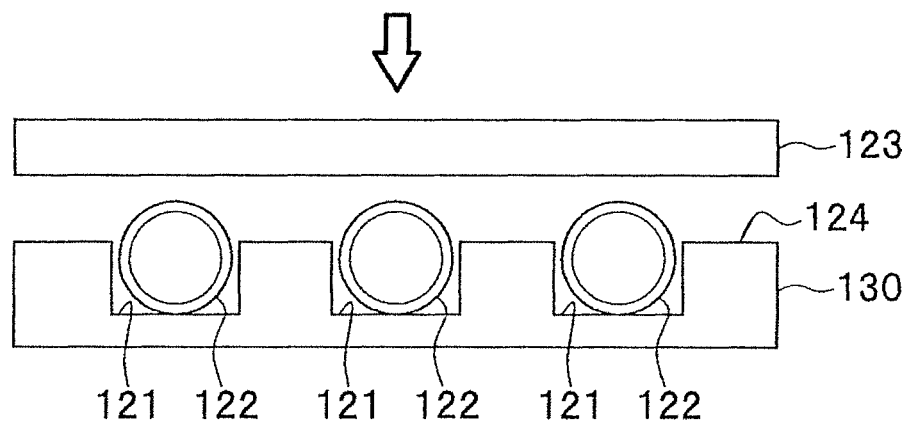
FIG. 25 is a drawing showing a method of manufacturing the conventional heat transfer plate.

Here, FIG. 23 is a graph showing a correlation between a pin top end position of a rotation tool, a lid thickness, and an outer diameter of a copper pipe. The graph shows a depth position (hereinafter referred to as "depth Y") of a pin top end in horizontal axis; and "lid thickness+copper pipe diameter/4" (hereinafter referred to as "length Z").

That is, depth Y=pin length G (mm)+pushed-in amount H (mm); and length Z=lid thickness F (mm)+copper-pipe outer diameter B/4 (mm). A plot point $X_1$ is a point showing the condition 3 of the example 1 (see Table 2: pin length G=8.0 mm, pushed-in amount H=1.0 mm). Furthermore, a plot point $X_2$ is a point showing the condition 7 of the example 2 (see Table 3: pin length G=8.0 mm, pushed-in amount H=1.0 mm). Furthermore, the copper-pipe outer diameters B and lid thicknesses F of other plot points are as shown in legends of FIG. 23.

Namely, considering that the condition 3 of the example 1 and the condition 7 of the example 2 are good, it was confirmed that the joining state is good when a correlation between the depth Y and the length Z is 0.8<Z<1.1Y.

Namely, as shown in a plot points $X_3$ and $X_4$, when the depth Y is set, for example, to be shallow and Y=7 mm, according to this, by making the lid thickness F thinner (lid thickness F=4.0 mm), it can be inferred that the joining state is favorable.

The invention claimed is:

1. A method of manufacturing a heat transfer plate where a heat medium pipe configured to circulate a heat medium for heating or cooling a heat component is housed inside a plate-form base member, the method comprising the steps of:
   inserting the heat medium pipe in a concave groove having a depth longer than an outer diameter size of the heat medium pipe, wherein the concave groove is open to an obverse of the base member;
   inserting a lid plate in an opening of the concave groove positioned at an upper portion of the heat medium pipe within the concave groove, wherein the lid plate is protruded more than the obverse of the base member;
   deforming the heat medium pipe plastically to make the heat medium pipe abut with the concave groove by pressing a protruded top end of the lid plate toward a bottom portion of the concave groove as far as the obverse of the base member; and
   fixing the lid plate to the base member by friction stirring joining.

2. The method according to claim 1, wherein a plastic fluidizing material fluidized due to frictional heat of the friction stirring joining is made to flow in air gap portions formed around the plastically deformed heat medium pipe.

3. The method according to claim 1, wherein a bottom portion of the concave groove is formed into a curved surface, wherein bottom-portion inlet corners at both ends of the bottom portion are machined to the curved surface in a width direction, and wherein the heat medium pipe is plastically deformed into an approximate ellipse along the bottom portion of the concave groove.

\* \* \* \* \*